United States Patent
DeRose-Wilson et al.

(10) Patent No.: US 12,535,787 B2
(45) Date of Patent: Jan. 27, 2026

(54) MULTI-UNIT AUTOMATION AND CONTROL SYSTEM

(71) Applicant: SmartRent Technologies, Inc., Scottsdale, AZ (US)

(72) Inventors: Isaiah DeRose-Wilson, Cave Creek, AZ (US); Jonathan Coffey, Phoenix, AZ (US); Braeden Scheer, Phoenix, AZ (US); Tyler Floyd, Gilbert, AZ (US); John Price, Mesa, AZ (US)

(73) Assignee: SmartRent Technologies, Inc., Scottsdale, AZ (US)

( * ) Notice: Subject to any disclaimer, the term of this patent is extended or adjusted under 35 U.S.C. 154(b) by 0 days.

(21) Appl. No.: 18/444,505

(22) Filed: Feb. 16, 2024

(65) Prior Publication Data
US 2024/0280951 A1 Aug. 22, 2024

Related U.S. Application Data

(60) Provisional application No. 63/446,789, filed on Feb. 17, 2023.

(51) Int. Cl.
G05B 19/042 (2006.01)
(52) U.S. Cl.
CPC .... G05B 19/042 (2013.01); *G05B 2219/2642* (2013.01)
(58) Field of Classification Search
CPC ............ G05B 19/042; G05B 2219/2642
See application file for complete search history.

(56) References Cited

U.S. PATENT DOCUMENTS

| | | |
|---|---|---|
| 2011/0224838 A1 | 9/2011 | Imes et al. |
| 2016/0234186 A1 | 8/2016 | Leblond et al. |
| 2016/0294572 A1 | 10/2016 | Shadid et al. |
| 2018/0119975 A1 | 5/2018 | Park et al. |
| 2018/0322598 A1* | 11/2018 | Collins ............... G06Q 30/04 |

(Continued)

OTHER PUBLICATIONS

International Search Report and Written Opinion dated May 31, 2024 in PCT International Patent Application No. PCT/US2024/016298.

*Primary Examiner* — Zhipeng Wang
(74) *Attorney, Agent, or Firm* — Snell & Wilmer L.L.P.

(57) ABSTRACT

A system is provided for multi-unit automation and access control for multi-family housing. Individual housing units have an associated control hub in communication with a remotely disposed system controller. Various sensors and effectors within the individual housing units may communicate with a corresponding hub, which may provide message regularization to facilitate interoperability of a wide array of sensors and effectors with the system controller. Both management representatives of the multi-family housing operator and residents may access the system controller via electronic devices such as smartphones. Thus, a resident and/or management representative may control effectors such as smart locks and may monitor sensors such as leak sensors or smoke alarms. Corrective maintenance work orders may be automatically generated to maintain an infrastructure of the multi-family housing in a desired condition and permit limited access to housing units for maintenance workers. Remote access by residents may enhance home automation experiences.

22 Claims, 10 Drawing Sheets

(56) References Cited

U.S. PATENT DOCUMENTS

| | | | |
|---|---|---|---|
| 2020/0219375 A1* | 7/2020 | Peros | G08B 27/00 |
| 2020/0279474 A1* | 9/2020 | Laurans | G08B 25/12 |
| 2021/0088984 A1 | 3/2021 | Sinha et al. | |
| 2022/0108385 A1* | 4/2022 | Bobsin | G06Q 50/16 |
| 2022/0398913 A1* | 12/2022 | White | G08B 25/001 |

* cited by examiner

WORK ORDER OVERVIEW 700

| | |
|---|---|
| CREATED | JUL 7, 2022 10:43 AM |
| CREATED BY | AUTOMATICALLY TRIGGERED |
| SERVICE PROBLEM | VIRTUAL DOOR LOCK BATTERY IS CRITICALLY LOW IN UNIT 1550 SMARTRENT QA AT SCOTTSDALE NORTH. PLEASE REPLACE THE BATTERIES AS SOON AS POSSIBLE |
| ISSUE LOCATION | N/A |
| STATUS | OPEN |
| PRIORITY | HIGH |
| PERMISSION TO ENTER | CALL REQUIRED |
| COMMENTS | THIS WAS AN AUTOMATICALLY GENERATED WORK ORDER FROM SMARTRENT |

ASSIGNMENTS

ASSIGNED TO 

VENDOR 

CREATE VENDOR

ACCESS PASS

THIS PROPERTY USES ALLOY PASS TO ACCESS UNITS

AFFECTED UNITS

UNIT 1550 SMARTRENT QA AT SCOTTSDALE NORTH     VIEW CODE

COMPLETE WORK ORDER     DESCRIBE THE WORK PERFORMED

COMPLETE

FIG.7

MULTI-UNIT AUTOMATION AND CONTROL SYSTEM

CROSS-REFERENCE TO RELATED APPLICATIONS

This application is based upon and claims the benefit of and priority to U.S. Provisional Patent Application No. 63/446,789 entitled "SYSTEMS AND METHODS FOR EDGE NETWORKS IN MULTI-FAMILY HOUSING," and filed on Feb. 17, 2023, the entire content of which is incorporated by reference herein.

BACKGROUND

1. Field

The various aspects and embodiments described herein relate to automation and access control systems, and more specifically, automation and control systems for multi-unit housing.

2. Description of the Related Art

In recent years, home automation products have become increasingly prevalent, allowing homeowners to monitor and control many devices around homes. For example, sensors may be monitored, both locally and from far away, via dedicated in-home devices or via a user's smartphone. Similarly, effectors may be controlled, both locally and from far away, via dedicated in-home devices or via a user's smartphone. However, owners and operators of multi-family housing complexes have different and unique challenges, as do their residents, and current home automation products lack important features for the multi-family or rental contexts. Thus, there remains a need for home automation and control systems for multi-family housing complexes.

SUMMARY

A multi-unit access and control system for providing automation and control to multi-family housing complexes may be provided. The system may include a first multi-family housing unit edge network associated with a first apartment and having a first control hub, a first sensor, and a first effector. The first sensor and the first effector are connected to the first control hub by at least one of a (i) wireless network and (ii) a wired connection. The first control hub has a processor and one or more non-transitory computer-readable storage devices storing computing instructions configured to run on the processor and cause the processor to perform various aspects. For instance, the processor may receive a fault condition alarm from the first sensor corresponding to a first fault condition detected by the first sensor. The processor may transmit a fault condition alarm message to a system controller in response to the fault condition alarm. After, and in response to, the transmitting the fault condition alarm message to the system controller, the processor may receive from the system controller, an access code for the first effector. The processor may install the access code on the first effector to allow a third-party to operate the first effector. In various embodiments, the operating the first effector provides physical access to the first sensor.

Various combinations of other features may be provided. The access code may be a one-time access code. The access code may be a revocable access code. The revocation may be based on a unit status (occupied, vacant, etc.) or an elapsed time, or other factors. The access code may be a time-limited access code. I first sensor may be a smoke detector having batteries and the first fault condition may be a depleted status of the batteries. The first effector may be an electronic door lock selectably engageable to permit physical access to the first sensor in response to entry of the first access code into a machine interface of the first effector. The machine interface may be is a wireless communication connection to a smartphone, such as a resident device. The machine interface may be a human-machine interface including a keypad or a touch-screen of the first effector. The installing the access code on the first effector may include storing in a local memory of the first effector, data corresponding to the first access code.

The installing the access code on the first effector may include causing the first effector to query at least one of the system controller, the control hub, and a local memory of the first effector in response to an entry of an entered access code to compare the entered access code to the first access code to selectively grant physical access to the first sensor in response to the entered access code matching the first access code. The installing the access code on the first effector may include causing the first effector to query a memory and/or processor of the first effector in response to an entry of an entered access code to compare the entered access code to the first access code to selectively grant physical access to the first sensor in response to the entered access code matching the first access code.

A first resident device may be connected to the system controller via a network, the first resident device configured to receive the fault condition alarm. A management device may be connected to the system controller via the network. The system controller may further transmit the access code for the first effector to the management device, wherein the management device transmits, via a local short-range electronic connection to the first effector, the first access code to the first effector to operate the first effector to provide physical access to the first sensor in response to physical proximity of the management device and the first effector being sufficiently near to permit the local short-range electronic connection.

In further instances, a management device may be connected to the system controller via a network. The management device transmits, to the system controller, an instruction, to cause the system controller to instruct the first effector to operate to provide physical access to the first sensor. In various instances, the management device may be connected directly to the first effector. In yet further instances, a management device is connected to the system controller via a network. The system controller further transmits the access code for the first effector to the management device. The management device transmits, via the network, the access code to the system controller to cause the system controller to operate the first effector to provide physical access to the first sensor. In some instances, the system controller may operate the first effector by transmitting a message to a hub controller which then may operate the first effector.

A first resident device may be connected to the system controller via a network, the first resident device configured to receive the fault condition alarm. A management device may be connected to the system controller via the network. The system controller may further transmit the access code for the first effector to the management device for viewing by a user. The user may input the first access code into a user interface of the first effector. The first effector may operate to provide physical access to entry of the access code.

A first resident device may be connected to the system controller via a network, the first resident device configured to receive the fault condition alarm. A management device may be connected to the system controller via the network. The management device may transmit an actuation instruction to the system controller. The system controller may further transmit the actuation instruction to the first effector to operate the first effector to provide physical access to the first sensor in response to the actuation instruction. In some instances, the system controller may transmit the actuation instruction to the first effector by transmitting a message to a hub controller which then may transmit the actuation instruction to the first effector. In various instances, the management device may be connected directly to the first effector and transmits the actuation instruction thereto.

In various embodiments, the multi-unit access and control system also includes a second multi-family housing unit edge network associated with a second apartment. The second multi-family housing unit edge network may have a second control hub, a second sensor, and a second effector. The second sensor and the second effector are connected to the second control hub by at least one of a (i) wireless network and (ii) a wired connection. The second control hub has a processor and one or more non-transitory computer-readable storage devices storing computing instructions configured to run on the processor and cause the processor to perform various aspects. For instance, the processor of the second control hub may receive a second fault condition alarm from the second sensor. The second control hub may transmit a second fault condition alarm message to the system controller in response to the second fault condition alarm. After, and in response to, the transmitting the second fault condition alarm message to the system controller, the second control hub may receive, from the system controller, a second access code for the second effector. The second control hub may install the second access code on the second effector to allow the third-party to operate the second effector. The operating the second effector provides physical access to the second sensor.

A management device may be connected to the system controller via the network, wherein the system controller further transmits both the first access code and the second access code to the management device. The management device transmits, via a local short-range electronic connection to the first effector, the first access code to the first effector to operate the first effector to provide physical access to the first sensor in response to physical proximity of the management device and the first effector being sufficiently near to permit the local short-range electronic connection. The management device transmits, via a local short-range electronic connection to the second effector, the second access code to the second effector to operate the second effector to provide physical access to the second sensor in response to physical proximity of the management device and the second effector being sufficiently near to permit the local short-range electronic connection.

One or more further aspects may be provided. In various embodiments, the second access code and the first access code are different. Moreover, the first fault condition may be a detection of a water leak by the first sensor. The first fault condition may be a detection of smoke by the first sensor. The first sensor may further include a virtual sensor disposed in the system controller and corresponding to a timer and/or event (collectively, "first expiration indicia") indicating an expiration of a lease term associated with the first apartment.

The system controller further may transmit a message to the first effector to deauthorize access by a user to the first effector, the first user having a unique user access code for the first effector that is deactivated, in response to the expiration of the lease term.

Other embodiments may be provided. For instance, in an additional embodiment, another multi-unit access and control system is provided to offer automation and control to multi-family housing complexes. The system has a first multi-family housing unit edge network associated with a first apartment and having a first control hub, a first sensor, and a first effector. The first sensor and the first effector are connected to the first control hub by at least one of a (i) wireless network and (ii) a wired connection. The first control hub includes a processor and one or more non-transitory computer-readable storage devices storing computing instructions configured to run on the processor and cause the processor to perform additional aspects. These aspects may include receiving a fault condition alarm from the first sensor corresponding to a first fault condition detected by the first sensor. These aspects may include transmitting a fault condition alarm message to a system controller in response to the fault condition alarm. After, and in response to, the transmitting the fault condition alarm message to the system controller, the aspects may include receiving, from the system controller a first corrective instruction to the first effector to cause the first effector to actuate, the actuating ameliorating the first fault condition.

Further features may be provided in different combinations. In some instances, the first sensor is a leak detector, the first effector includes a water valve, and the first fault condition is a detection of a water leak by the leak detector. The actuating ameliorates the first fault condition by closing the water valve of the first effector to stop a flow of water associated with the water leak.

In various instances, the first sensor is a virtual sensor disposed in the system controller and corresponding to a timer and/or event (collectively, "first expiration indicia") indicating an expiration of a lease term associated with the first apartment. The first effector is a smart lock. The first fault condition is a detection of a valid user access code of a user of the apartment associated with the lease term that is expired. The actuating ameliorates the first fault condition by denying unlocking of the smart lock responsive to an entry of the valid user access code of the user of the apartment.

In various embodiments, the first sensor is a smoke detector. The first effector is a workorder generation script operative in the system controller, and the first fault condition is a detection of a depleted battery in the smoke detector by the first sensor. The actuating ameliorates the first fault condition by generating a work order and associated access code for a smart lock (first effector) associated with physical access to the smoke detector (first sensor). The actuating further ameliorates the first fault condition by transmitting an alert message to a management device to provide a notification that the depleted battery is depleted.

Another embodiment may be provided for a multi-unit access and control system for providing automation and control to multi-family housing complexes. The system may have a first multi-family housing unit edge network associated with a first apartment and having a first sensor and first effector, the network connected to a system controller via a network. The system may have a second multi-family housing unit edge network associated with a second apartment and having a second sensor and second effector, the second multi-family housing unit edge network connected to the system controller via the network. The system may have a management device including a smartphone application connectable to the system controller. The system controller may include an access control module configured to: (i) selectively authorize connection of a first resident device to the first multi-family housing unit edge network via the network; (ii) selectively to disallow connection of the first resident device to the second multi-family housing unit edge network; (iii) selectively authorize connection of a second resident device to the second multi-family housing unit edge network via the network; (iv) selectively to disallow connection of the second resident device to the first multi-family housing unit edge network. The system controller is configured to receive a first alarm from the first sensor corresponding to a detected environmental condition in the first apartment and trigger an alert on the first resident device corresponding to the first alarm. The first effector is configured to actuate in response to the first alarm. The system controller is configured to receive a second alarm from the second sensor corresponding to a detected environmental condition in the second apartment and trigger an alert on the second resident device corresponding to the second alarm. The second effector is configured to actuate in response to the second alarm. The system controller transmits a first message to the management device in response to the first alarm and a second message to the management device in response to the second alarm.

A system may include a system controller and a control hub. Included one of the system controller and control hub or distributed across the combination of the system controller and the control hub, the system may have one or more processor and one or more non-transitory computer readable storage device storing computer instructions configured to run on the one or more processors and cause the one or more processors to perform various operations. The system may also have one or more edge device such as a sensor or an effector. The one or more processors may receive a low battery alarm from the edge device. The one or more processors may create a work order for the edge device. The one or more processors may create a notification pursuant to one or more notification settings. The one or more processors may provide an access mechanism for the edge device.

Other features may also be included. In some instances, the low battery alarm is received within an edge network (e.g., a multi-family housing unit edge network) and the work order is created outside the edge network. The notification may be created using a notification template. The notification template may be is populated using an attribute of the edge device discovered in response to receiving the low battery alarm.

In various embodiments, the receiving the low battery alarm includes receiving a plurality of low battery alarms from only one edge device. In various embodiments, the receiving the low battery alarm includes determining that the edge device is malfunctioning. The creating the work order may include adding a notation in the work order to repair or replace the edge device.

In various embodiments, the receiving the low battery alarm includes receiving a plurality of low battery alarms from only one edge device; and deduplicating the plurality of low battery alarms. The computing instructions may be further configured to run on the one or more processors and cause the one or more processors to perform: transmitting only one low battery alarm of the plurality of low battery alarms to a web server (e.g., system controller).

The computing instructions may be further configured to run on the one or more processors and cause the one or more processors to perform: in response to the receiving the low battery alarm, initiating a script for a recovery algorithm; and registering the edge device in an edge network managed by the system after completing the recovery algorithm. The computing instructions may be further configured to run on the one or more processors and cause the one or more processors to perform: in response to the receiving the low battery alarm, querying the edge device for device attributes of the edge device. The computing instructions may be further configured to run on the one or more processors and cause the one or more processors to perform: in response to the receiving the low battery alarm, changing a local record of a setting for the edge device. In various embodiments, the edge device is a smart lock in a multi-family housing complex.

A method is also provided. The method may be implemented via execution of computing instructions configured to run at one or more processors and configured to be stored at non-transitory computer-readable media. The method may include receiving a low battery alarm from an edge device. The method may include creating a work order for the edge device. The method may include creating a notification pursuant to one or more notification settings. Finally, the method may include providing an access mechanism for the edge device.

The method may have one or more additional features. For instance, in some instances of the method, the low battery alarm is received within an edge network and the work order is created outside the edge network. In various embodiments, the notification is created using a notification template. In various embodiments, the notification template is populated using an attribute of the edge device discovered in response to receiving the low battery alarm.

The receiving the low battery alarm may have other aspects. For instance, the receiving may include receiving a plurality of low battery alarms from only one edge device; and determining that the edge device is malfunctioning. The creating the work order may include adding a notation in the work order to repair or replace the edge device.

In various embodiments, the receiving the low battery alarm includes receiving a plurality of low battery alarms from only one edge device; and deduplicating the plurality of low battery alarms. The computing instructions are further configured to run on the one or more processors and cause the one or more processors to perform various aspects. For instance, the processors maybe caused to transmit only one low battery alarms of the plurality of low battery alarms to a web server.

In various embodiments, the method also includes, in response to the receiving the low battery alarm, initiating a script for a recovery algorithm; and registering the edge device in an edge network managed by the system after completing the recovery algorithm. The method may include, in response to the receiving the low battery alarm, querying the edge device for device attributes of the edge device. The computing instructions may be further configured to run on the one or more processors and cause the one or more processors to perform in response to the receiving the low battery alarm, changing a local record of a setting for the edge device. The edge device may be a smart lock in a multi-family housing complex.

BRIEF DESCRIPTION OF THE DRAWINGS

Other apparatus, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

FIG. 7 illustrates an example work order generated in connection with the method of FIG. 6, in accordance with various embodiments.

DETAILED DESCRIPTION

Figure 1:
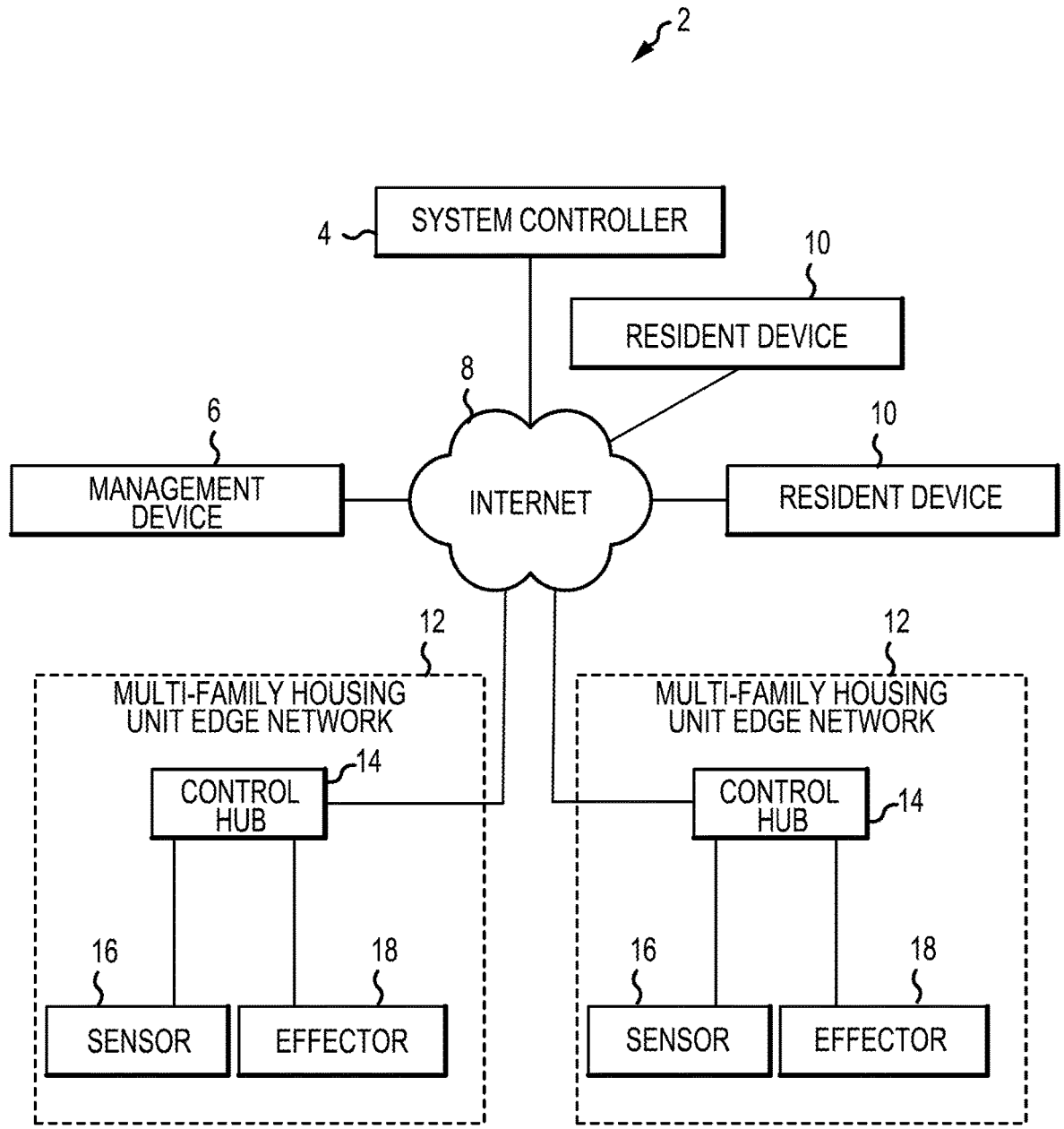
FIG. 1 illustrates a multi-unit access and control system for providing automation and control to multi-family housing complexes, in accordance with various embodiments.

Despite the increasing prevalence of home automation and control systems, current solutions are inadequate for multi-family housing scenarios. Various solutions are provided in this disclosure. For example, in various instances, residents of multi-family housing units (e.g., apartments) may desire home automation control of features within their housing unit. For instance, an apartment resident may desire the ability to control lighting, HVAC systems, door locks, automatic vacuuming devices, or automatic mopping devices. An apartment resident may wish to monitor sensed environmental or other factors within an apartment unit, such as temperature, HVAC status, door lock status, light status, cameras, leak detection, and the like. This capability may be desired when locally within the unit such as via a local control device that a user interacts with via touch screen, voice command, or other human-device interface. This capability may also be desired when away from the unit such as via a smartphone. Moreover, various automatic routines or processes may be desired, such as for the status of features within their housing unit to change in response to different conditions. For instance, an apartment resident may wish for lighting or HVAC systems to automatically default to different settings depending on door lock status. Other triggers for automatic control or changing of different settings may include time of day, whether a device (e.g., smartphone) of a user is inside an apartment or away from the apartment, and the like. An apartment resident may wish to know when alarm conditions occur such as leaks or physical plant failures (e.g., HVAC failure, power outage, etc.).

In addition, owners and operators of multi-family housing units may desire access to various control or monitoring features, as well as to know when alarm conditions occur. Moreover, owners and operators of multi-family housing units may desire the ability to automatically generate outputs, workflows, etc., based on monitoring aspects. For instance, in response to detecting that smoke detector batteries are nearing depletion, an owner or operator of a multi-family housing unit may wish to automatically generate a workorder for replacement by a maintenance worker of the smoke detector batteries, generation of notices to a resident of the affected housing unit, and the like. Furthermore, owners and operators of multi-family housing units as well as residents may desire the ability to control a smart lock in response to monitoring aspects, such as by generating an access code for a maintenance worker to enter the apartment unit to change the smoke detector batteries. Limitations on these access codes may be advantageous. An access code may be limited to a pre-authorized window of time such as may be requested by a resident via a smartphone application, or such as permitted via automatic rules that can be preset. The access code may be a one-time access code. The access code may be a revocable access code. The revocation may be based on a unit status (occupied, vacant, etc.) or an elapsed time, or other factors. The access code may be a time-limited access code.

There are other particularly daunting challenges in the muti-family housing context. These and other features which will become apparent upon reviewing the following disclosure may facilitate improved automation control, access control, energy efficiency, safety, and maintenance of multi-family housing complexes.

Turning now to FIG. 1, in various embodiments, a multi-unit automation and access control system 2 may include a system controller 4. A system controller 4 may comprise a computer, a server, a distributed computer, a distributed server, or any other computing device configured to connect to other aspects of the system 2 and provide control and access. In various embodiments, the system controller 4 performs calculations, executes methods, controls access or permissions among different system components, and the like.

The system 2 may include a management device 6. A management device 6 may comprise a computer operated by an individual or entity associated with the property management of multiple housing units within a multi-family housing facility. As such, a management device 6 may have certain data access rights and/or certain control rights to access sensors 16 or data or control effectors 18 that are associated with multiple different housing units. These access rights may change dynamically in response to sensors or effectors in different housing units. For example, the management device 6 may have a capability to unlock a smart lock and access an apartment at any time of day or night if that apartment is not leased to a resident, whereas electronic access may be limited to only a housing unit associated with a work order for entry and repair, or limited to only certain hours for a unit that is leased to a resident.

The system controller 4 may connect to the management device 6 and send data to the management device 6 and receive data from the management device 6. This data can include messages, alarms, instructions, settings, and/or changes to the same. The management device 6 may be referred to as a device herein but may be a smartphone application or a browser session or other instance running on a computing platform such as a smartphone.

The system 2 may include one or more resident devices 10. FIG. 1 illustrates a first resident device 10 and a second resident device 10, though any number of resident devices 10 may be provided. A resident device 10 may comprise a computer operated by an individual associated with a single housing unit within a muti-family housing facility. As such, different resident devices 10 may have different data access rights and/or different control rights to access different sensors 16 or different data or control different effectors 18 that are associated with different housing units. The system controller 4 may connect to the resident devices 10 and send data to each resident device 10 and receive data from each resident device 10. This data can include messages, alarms, instructions, settings and/or changes to the same. The resident device 10 may be referred to as a device herein but may be a smartphone application or a browser session or other instance running on a computing platform such as a smartphone.

The system 2 may include one or more multi-family housing unit edge networks 12. FIG. 1 illustrates a first multi-family housing unit edge network 12 and a second multi-family housing unit edge network 12, though any number of multi-family housing unit edge networks 12 may be provided. A multi-family housing unit edge network 12 may comprise a collection of sensors 16, effectors 18, and one or more computing device (e.g., a control hub 14) associated with control of the sensors 16 and effectors 18. Each such collection may be associated with a physical housing unit, for instance an apartment. As such, different multi-family housing unit edge networks 12 may have different data access rights and/or different control rights to access different sensors 16 or different data or control different effectors 18 that are associated with different housing units (e.g., different multi-family housing unit edge networks 12). The system controller 4 may connect to the multi-family housing unit edge network 12 and may send data to the multi-family housing unit edge network 12 and may receive data from the multi-family housing unit edge network 12. This data can include messages, alarms, instructions, settings and/or changes to the same.

As mentioned, each multi-family housing unit edge network 12 may include sensors 16 and effectors 18 and a control hub 14. In FIG. 1, a first sensor 16 and first effector 18 and a first control hub 14 are associated with a first multi-family housing unit edge network 12 and a second sensor 16 and second effector 18 and second control hub 14 are associated with a second multi-family housing unit edge network 12. Each control hub 14 may send data to and from a system controller 4 for dissemination to resident devices 10 and/or management devices 6 and may receive data from a system controller 4, such as for dissemination to a first sensor 16 and/or effector 18. The control hub 14 may comprise a computing device that performs calculations, executes methods, controls access or permissions among different system components, and the like. In various instances, the control hub 14 connects to the system controller 4 and/or a resident device 10 and/or a management device 6 via a network 8. The network 8 may be the internet.

Before discussing the various different types of sensor 16 or effector 18 devices, a specific discussion of the control hub 14 is warranted. The system 2 may include a control hub 14 in each physical housing unit (e.g., apartment). Each control hub 14 connects to different sensors 16 and effectors 18 also associated with the apartment and enables their communication with the system controller 4, and in turn, the management device 6 and resident device 10. Thus, a control hub 14 of a multi-family housing unit edge network 12 may be associated with a physical housing unit (e.g., apartment) and may be in operative communication with the system controller 4 via a network 8. An apartment may have various different smart devices (collectively, sensor(s) 16 and effector(s) 18), each communicating with different data structures, data fields, etc. This can make communication with the system controller 4 or any shared backend control platform challenging. In various instances, a control hub 14 is installed in an apartment and communicates with different smart devices by a protocol such as Z-wave. The control hub 14 has a data transformation and/or filtering function, operating in a protocol agnostic way so that there is an abstraction layer to unify protocols of end devices and then communicate data with the remote system in a shared, common format.

The control hub 14 may also have a rules engine aspect to filter erroneous messages. For instance, an end device in an apartment may have a sensor 16 to detect fault conditions such as water leaks. However, the sensor 16 may generate false positive detections. The control hub 14 may include logic to eliminate false positives, such as ignoring leak indications that are brief and transient, but taking action based on leak indications that continue over a period of time. For instance, in one embodiment, a leak indication that indicates a leak persisting for at least ten minutes may generate a message from the control hub 14 to a system controller 4, then the system controller 4 may generate a work order for a maintenance person to fix the leak and may send the work order to a management device 6 operated by the maintenance person. The system controller 4 may also generate an access code to access the apartment via a smart lock (e.g., effector 18), and both provide this code via the control hub 14 to the smart lock (effector 18) in the apartment and provide this code to a smartphone (management device 6) operated by a maintenance person. The maintenance person can enter the code into the smart lock and gain access to the apartment to repair the leak.

In further embodiments, rather than generating an access code, a pre-authorized management device 6 may, upon receiving the work order, have the ability to cause a message to be transmitted from the management device 6 to the system controller 4 which causes the system controller 4 to instruct the effector 18 (via the control hub 14) to operate. Thus, once a management device 6 is authorized, then operating the effector 18 may proceed without an access code, such as by pressing a button displayed in the work order. Other operative mechanisms are also possible.

The access code may be a one-time access code, usable only once. The access code may be a persistent code that is active until revoked by the system controller 4. The revocation may be based on a unit status (occupied, vacant, etc.) or an elapsed time, or other factors. The access code may be a time-limited access code (e.g., revoked based on an elapsed time). The maintenance person may interact with the smartphone to confirm that after gaining access to the apartment to repair the leak, the leak has been repaired (e.g., the workorder has been "completed"), after which the smartphone transmits a message to the system controller 4 which then revokes the access code, instructing the smart lock to delete access to the apartment via the access code.

Thus, one may say that the control hub 14 is operable to normalize, regularize, and/or transform data passing from a protocol-diverse environment of an apartment with different devices using different protocols, assimilating this data into a known, shared, and common format for transacting with a remote system such as a server and/or smartphones.

With this helpful use case in mind, attention now shifts to a specific discussion of features associated with the sensor 16 and features associated with the effector 18. In an example, the sensor 16 may comprise a thermostat, a leak sensor, a motion sensor, a contact sensor, a sensor of a garage controller such as a garage door position sensor, a sensor of a light dimmer, a sensor to determine a switch position, a sensor to determine whether an electrical outlet is providing power to a device, a smart lock device, a smoke detector device, and the like. In various embodiments, an effector 18 may comprise an aspect co-located and packaged together with the sensor 16 and in further embodiments, an effector 18 may be a separately housed device. The effectors 18 may comprise an aspect of a smart lock such as a locking and unlocking actuator, aspects of a thermostat such as a circuit to adjust a set point or operating mode of an HVAC system, a valve, a motor to move a physical object, an aspect of a garage door opener to impart motion to a garage door, an aspect of a dimmer switch to adjust an amount of current passing through the dimmer switch, an aspect of a switch to adjust a state of the switch, and/or an aspect of an electrical outlet to electrically energize or de-energize the electrical outlet. Other types of effectors 18 are contemplated.

Having introduced each constituent portion of a system 2, now is a convenient time to elaborate on different embodiments of the system 2 as it operates. For example, a system 2 for providing automation and control to multi-family housing complexes may be provided. The system 2 may include a first multi-family housing unit edge network 12 associated with a first apartment and having a first control hub 14, a first sensor 16, and a first effector 18. The first sensor 16 and the first effector 18 are connected to the first control hub 14 by at least one of a (i) wireless network and (ii) a wired connection. The first control hub 14 has a processor and one or more non-transitory computer-readable storage devices storing computing instructions configured to run on the processor and cause the processor to perform various aspects.

For instance, the processor may receive a fault condition alarm from the first sensor 16 corresponding to a first fault condition detected by the first sensor 16. A fault condition may be any condition associated with an unwanted, damaging, or unexpected aspect of an environment. For instance, the presence of a water leak is a fault condition. A failure of an HVAC system is a fault condition. An excessive depletion of a battery in a device such as a sensor is a fault condition. Other fault conditions are implied throughout this disclosure.

The processor may transmit a fault condition alarm message to a system controller 4 in response to the fault condition alarm. After, and in response to, the transmitting the fault condition alarm message to the system controller 4, the processor may receive from the system controller 4, an access code for the first effector 18. The processor may install the access code on the first effector 18 to allow a third-party to operate the first effector 18. In various embodiments, the operating the first effector 18 provides physical access to the first sensor 16.

Various combinations of other features may be provided. For instance, the first sensor 16 may be a smoke detector having batteries. The first sensor 16 may be another type of sensor having batteries. The first fault condition may be a depleted status of the batteries. The first effector 18 may be an electronic door lock selectably engageable to permit physical access to the first sensor 16 in response to entry of the access code ("first access code") into a machine interface of the first effector 18. The machine interface may be is a wireless communication connection to a smartphone, such as a resident device 10. The machine interface may be a human-machine interface comprising a keypad or a touchscreen of the first effector 18. The installing the access code on the first effector 18 may include storing in a local memory of the first effector 18, data corresponding to the first access code.

The installing the access code on the first effector 18 may comprise causing the first effector 18 to query at least one of the system controller 4, the control hub 14, and/or a local memory or processor of the first effector 18 in response to an entry of an entered access code. The query may be to compare the entered access code to the first access code. The first access code (or corresponding data such as a hash) may be stored in the system controller 4, the control hub 14, and/or a local memory or processor of the first effector 18. In response to the entered access code matching the first access code, the first effector 18 may selectively grant physical access to the first sensor 16 in response to the entered access code matching the first access code.

A first resident device 10 may be connected to the system controller 4 via a network 8, the first resident device 10 configured to receive the fault condition alarm. A management device 6 may be connected to the system controller 4 via a network 8. The system controller 4 may further transmit the access code for the first effector 18 to the management device 6. The management device 6 transmits, via a local short-range electronic connection to the first effector 18 such as Bluetooth®, the first access code to the first effector 18 to operate the first effector 18 to provide physical access to the first sensor 16 in response to physical proximity of the management device 6 and the first effector 18 being sufficiently near to permit the local short-range electronic connection.

In further instances, the management device 6, transmits, by a connection to the system controller 4, an instruction to actuate the first effector 18, which may or may not include the access code. The system controller 4 then instructs, via a control hub 14, the first effector 18 to operate. In further instances, the management device 6, transmits, by a connection to the control hub 14, an instruction to actuate the first effector 18, which may or may not include the access code. The system controller 4 then instructs, via a control hub 14 the first effector 18 to operate.

The system 2 may also include a second multi-family housing unit edge network 12 associated with a second apartment. Thus, a system 2 may be associated with many apartments sharing a same system controller 4. The second multi-family housing unit edge network 12 may have a second control hub 14, a second sensor 16, and a second effector 18. The second sensor 16 and the second effector 18 are connected to the second control hub 14 by at least one of a (i) wireless network and (ii) a wired connection. The second control hub 14 has a processor and one or more non-transitory computer-readable storage devices storing computing instructions configured to run on the processor and cause the processor to perform various aspects.

For instance, the processor of the second control hub 14 may receive a second fault condition alarm from the second sensor 16. The second control hub 14 may transmit a second fault condition alarm message to the system controller 4 in response to the second fault condition alarm. After, and in response to, the transmitting the second fault condition alarm message to the system controller 4, the second control hub 14 may receive from the system controller 4, a second access code for the second effector 18. The second control hub 14 may install the second access code on the second effector 18 to allow the third-party to operate the second effector 18. The operating the second effector 18 provides physical access to the second sensor 16.

A management device 6 may be connected to the system controller 4 via the network 8, wherein the system controller 4 further transmits both the first access code and the second access code to the management device 6. The management device 6 transmits, via a local short-range electronic connection to the first effector 18, the first access code to the first effector 18 to operate the first effector 18 to provide physical access to the first sensor 16 in response to physical proximity of the management device 6 and the first effector 18 being sufficiently near to permit the local short-range electronic connection. The management device 6 transmits, via a local short-range electronic connection to the second effector 18, the second access code to the second effector 18 to operate the second effector 18 to provide physical access to the second sensor 16 in response to physical proximity of the management device 6 and the second effector 18 being sufficiently near to permit the local short-range electronic connection. In some scenarios, the second access code and the first access code are different. In various instances, the access code(s) is/are displayed on a screen and manually entered into a smart lock by a user.

The aforementioned "fault condition" may correspond to various events. Some such events were introduced previously, but others are possible. For example, the first fault condition may be a detection of a water leak by the first sensor 16. The first fault condition may be a detection of smoke by the first sensor 16. The first sensor 16 may further comprise a virtual sensor disposed in the system controller 4 and corresponding to a timer and/or event (collectively, "first expiration indicia") indicating an expiration of a lease term associated with the first apartment. The system controller 4 further may transmit a message to the first effector 18 (such as via a control hub 14 and/or via a direct connection over a network) to deauthorize access by a user to the first effector 18, the first user having a unique user access code for the first effector 18 that is deactivated, in response to the expiration of the lease term.

Other embodiments may be provided. These embodiments may share at least some features with one another or those discussed elsewhere herein. In an additional embodiment, another system 2 is provided to offer automation and control to multi-family housing complexes. The system 2 has a first multi-family housing unit edge network 12 associated with a first apartment and having a first control hub 14, a first sensor 16, and a first effector 18. The first sensor 16 and the first effector 18 are connected to the first control hub 14 by at least one of a (i) wireless network and (ii) a wired connection. The first control hub 14 includes a processor and one or more non-transitory computer-readable storage devices storing computing instructions configured to run on the processor and cause the processor to perform additional aspects. These aspects may include receiving a fault condition alarm from the first sensor 16 corresponding to a first fault condition detected by the first sensor 16. These aspects may include transmitting a fault condition alarm message to a system controller 4 in response to the fault condition alarm. After, and in response to, the transmitting the fault condition alarm message to the system controller 4, the aspects may include receiving, from the system controller 4 a first corrective instruction to the first effector 18 to cause the first effector 18 to actuate, the actuating ameliorating the first fault condition. As used herein, a corrective instruction may comprise a command to an effector 18 to diminish or resolve or otherwise change a detected condition that is detected by a sensor 16.

Further features may be provided in different combinations. In some instances, the first sensor 16 is a leak detector, the first effector 18 includes a water valve, and the first fault condition is a detection of a water leak by the leak detector. The actuating ameliorates the first fault condition by closing the water valve of the first effector 18 to stop or restrict a flow of water associated with the water leak.

In various instances, the first sensor 16 is a virtual sensor disposed in the system controller 4 and corresponding to a timer and/or event (collectively, "first expiration indicia") indicating an expiration of a lease term associated with the first apartment. The first effector 18 is a smart lock. The first fault condition is a detection of a valid user access code of a user of the apartment associated with the lease term that is expired. The actuating ameliorates the first fault condition by denying unlocking of the smart lock responsive to an entry of the valid user access code of the user of the apartment.

In various embodiments, the first sensor 16 is a smoke detector. The first effector 18 is a workorder generation script operative in the system controller 4, and the first fault condition is a detection of a depleted battery in the smoke detector by the first sensor 16. The actuating ameliorates the first fault condition by generating a work order and associated access code for a smart lock (first effector 18) associated with physical access to the smoke detector (first sensor 16). The actuating further ameliorates the first fault condition by transmitting an alert message to a management device 6 to provide a notification that the depleted battery is depleted.

Another embodiment may be provided for a system 2 for providing automation and control to multi-family housing complexes. The system 2 may have a first multi-family housing unit edge network 12 associated with a first apartment and having a first sensor 16 and first effector 18. The first multi-family housing unit edge network 12 is connected to a system controller 4 via a network 8. The system 2 may have a second multi-family housing unit edge network 12 associated with a second apartment and having a second sensor 16 and second effector 18. The second multi-family housing unit edge network 12 connected to the system controller 4 via the network 8.

The system 2 may have a management device 6 comprising a smartphone application connectable to the system controller 4. The system controller 4 may comprises an access control module configured to do one or more of the following: (i) selectively authorize connection of a first resident device 10 to the first multi-family housing unit edge network 12 via the network 8; (ii) selectively to disallow connection of the first resident device 10 to the second multi-family housing unit edge network 12; (iii) selectively authorize connection of a second resident device 10 to the second multi-family housing unit edge network 12 via the network 8; and (iv) selectively to disallow connection of the second resident device 10 to the first multi-family housing unit edge network 12.

The system controller 4 is configured to receive a first alarm from the first sensor 16 corresponding to a detected environmental condition in the first apartment and trigger an alert on the first resident device 10 corresponding to the first alarm. The first effector 18 is configured to actuate in response to the first alarm. The system controller 4 is configured to receive a second alarm from the second sensor 16 corresponding to a detected environmental condition in the second apartment and trigger an alert on the second resident device 10 corresponding to the second alarm. The second effector 18 is configured to actuate in response to the second alarm. The system controller 4 transmits a first message to the management device 6 in response to the first alarm and a second message to the management device 6 in response to the second alarm.

Consequently, a closed loop with a tangible, non-abstract physical reality may both cause detection of conditions by a sensor, and then may be changed by the system as the system causes an effector to respond to the conditions. In this manner, the system provides a machine that performs an act, or a series of acts, upon the subject matter to be transformed and reduced to a different state. For instance, the system provides a machine that may detect leaks, and transform a leaking pipe into a non-leaking pipe. The system provides a machine that may detect temperature of a space and transform the space into a space having a higher or lower temperature. The system provides a machine that may detect a locked space and/or an entry attempt thereto and transform a physical barrier of the space from a locked barrier into an openable barrier. Thus, the processes herein require that certain things should be done with certain substances, and in a certain order, and the machinery pointed out herein is suitable to perform the processes. As such, the relevant article is transformed and reduced to a different state or thing by the process performed by the machines. The process devices incorporates principles in a more efficient solution for access control and management of a physical space.

Figure 2A:
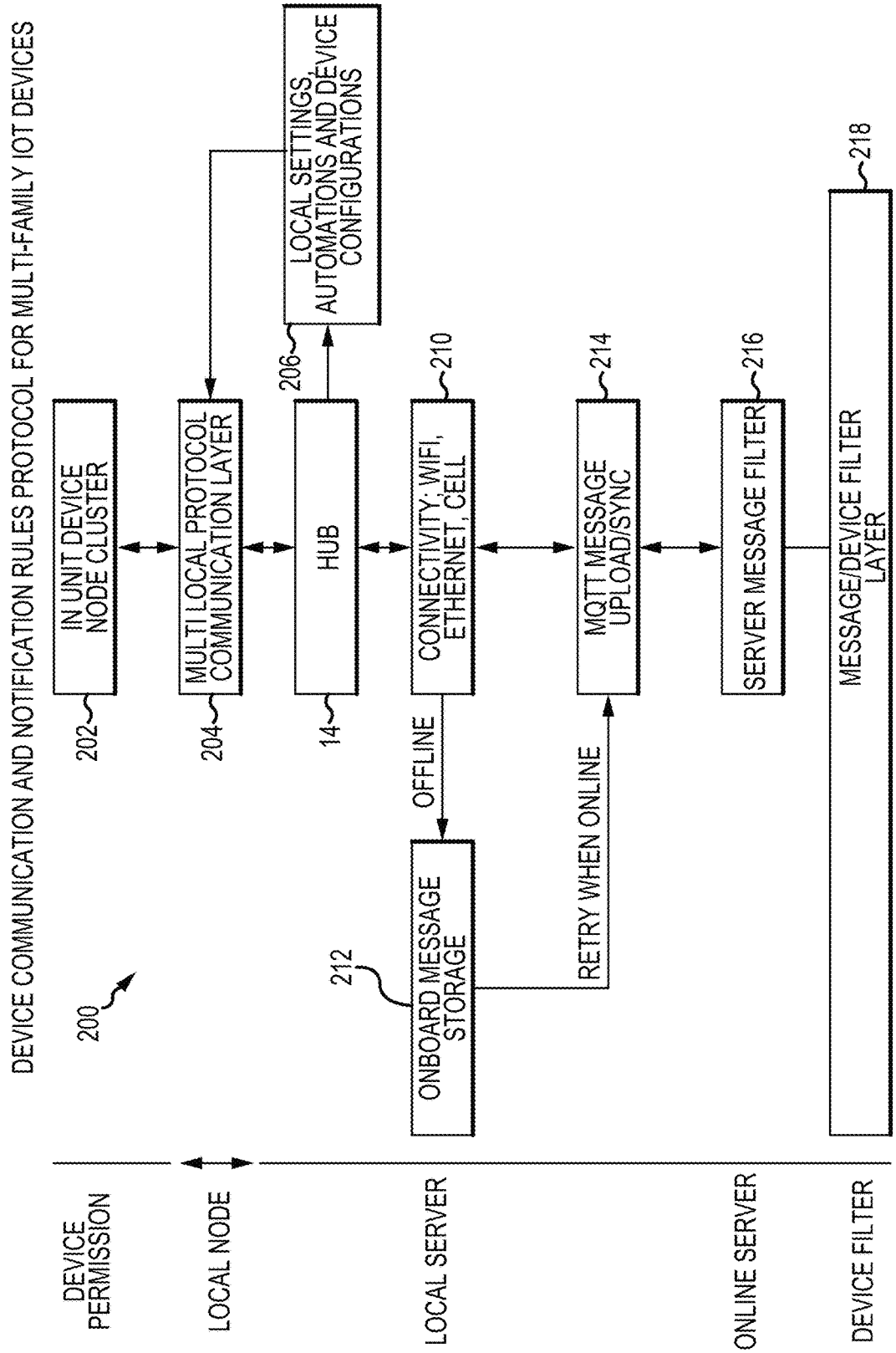
FIGS. 2A, 2B, and 2C illustrate different aspects of information exchange among components of a system of FIG. 1, with particular emphasis on protocol layers, in accordance with various embodiments.
Figure 2B:
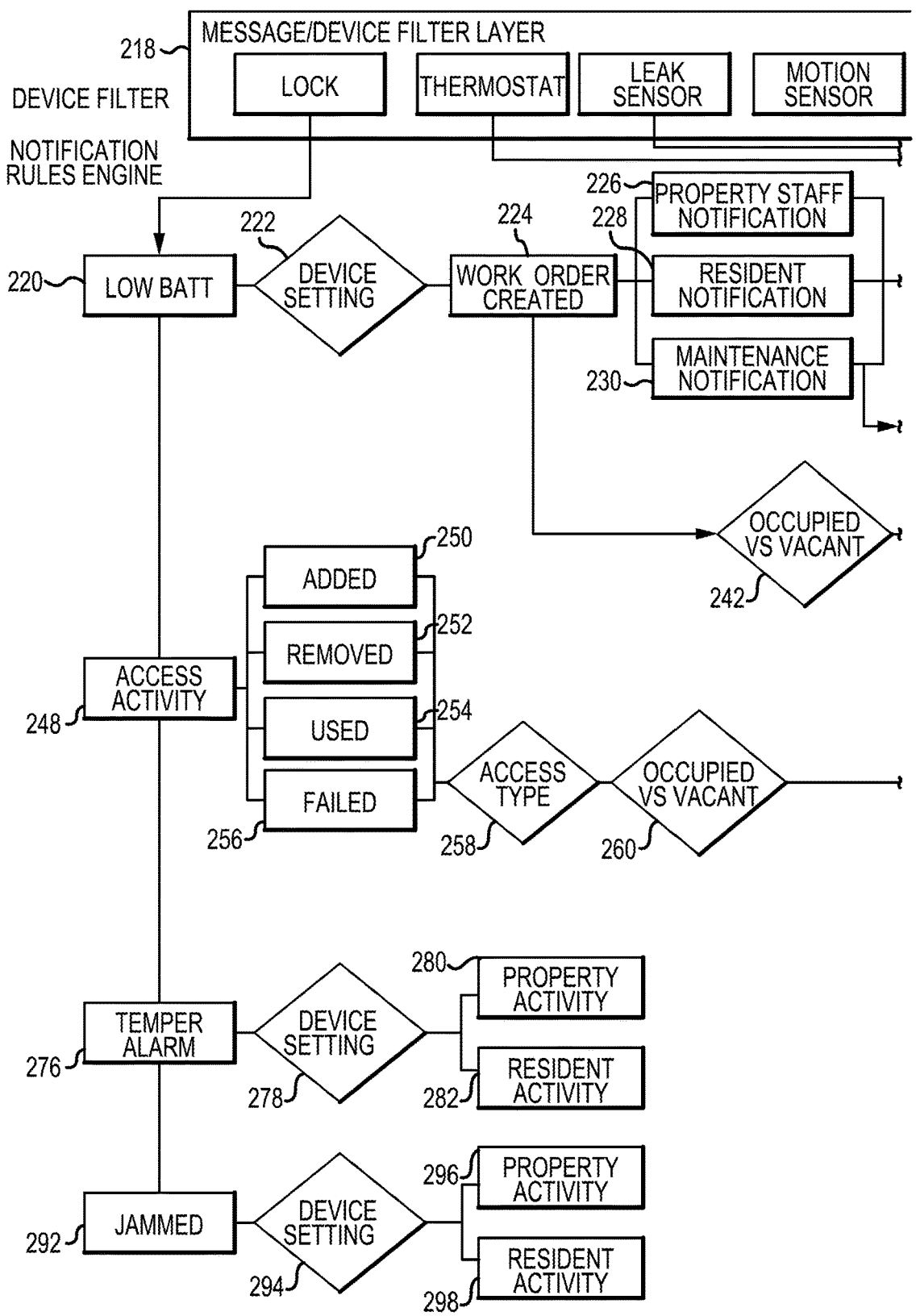
Figure 2C:
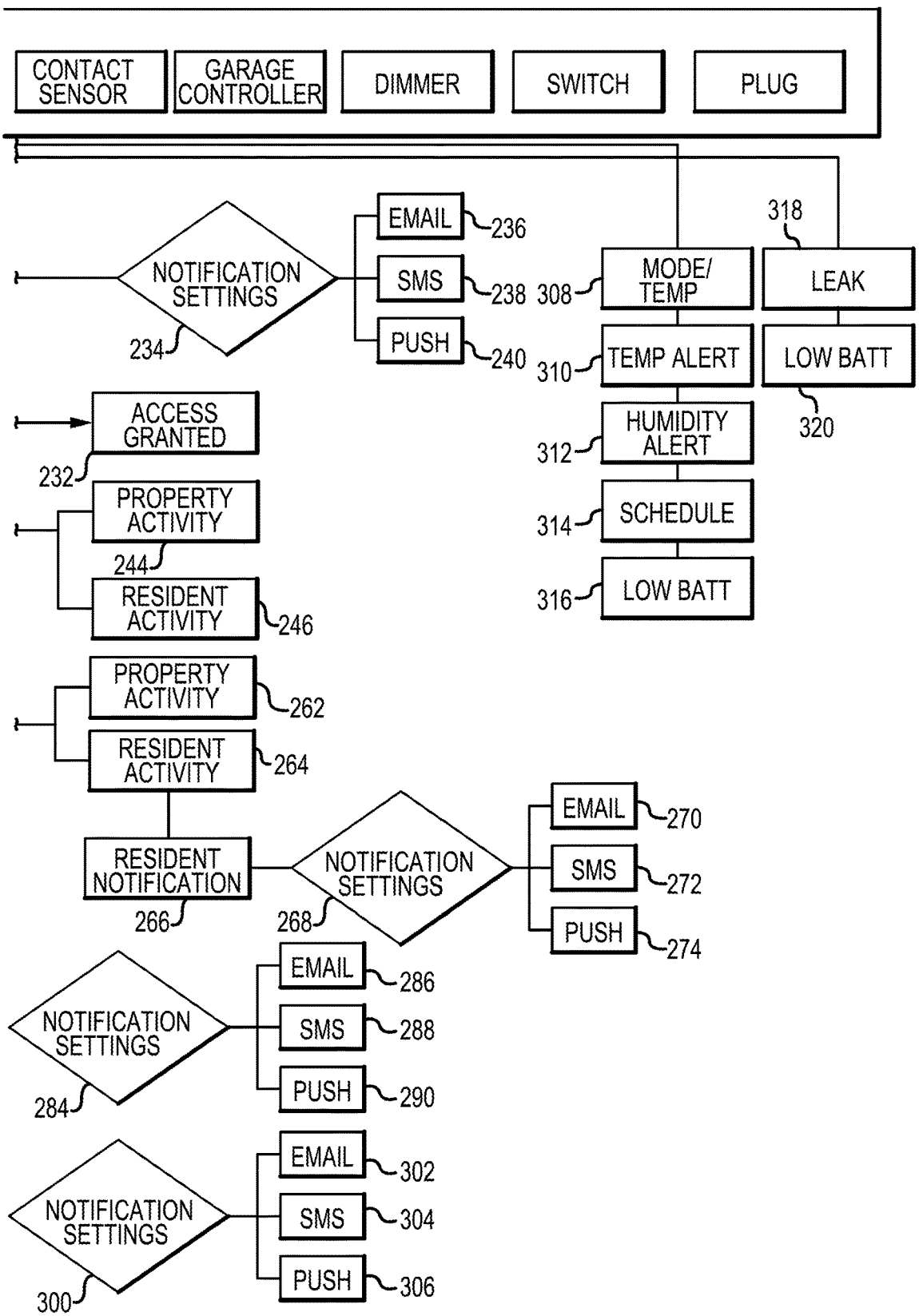

Referring now to FIG. 2A-C, but with occasional reference to FIG. 1, the different aspects of the system 2 may communicate messages. For ease of reference, various abstractions are frequently used when discussing communication among electronic devices. For instance, different abstractions may be termed "layers" or "abstraction layers" and may interoperate according to communication protocols. FIG. 2A-C illustrate various exchanges of data among different features of the system 2, but a reader will appreciate that various abstractions are relied upon to facilitate ease of understanding. Moreover, the different features of the system 2 may perform different aspects of the exchanges of data, and in some instances, multiple features of the system 2 may be involved. These structures facilitate the interoperability of devices connected to a control hub 14 (e.g., sensor(s) 16 and effector(s) 18) with a system controller 4, management device 6, and resident device 10, despite the disparate communication format and data structures used by different sensor(s) 16 and effector(s) 18.

For instance, referring now to communication diagram 200, in various embodiments an in-unit device node cluster 202 may correspond to a logical collection of devices within a single housing unit of a multi-family housing facility. In some instances, the logical collection of devices is the multi-family housing unit edge network 12 and the devices therein, such as a control hub 14, sensor 16, and effector 18. The control hub 14, sensor 16, and effector 18 may communicate amongst one another via a multi-local protocol communication layer 204. This communication layer includes the protocols to facilitate data exchange among the sensor 16, effector 18, and control hub 14. Different sensors 16 and effectors 18 may have different communication features. This communication layer interoperates with the control hub 14 to facilitate setting of local settings, automations, and device configuration 206. The control hub 14 provides appropriate translations, regularization, and structuring of data associated with the in unit device node cluster 202 (e.g., multi-family housing unit edge network 12) for further exchange with other aspects of system 2. In various embodiments, the hub is connected via a communication mechanism 210 such as Wi-Fi, Ethernet, cellular data, or the like to remote aspects. For instance, a multi-family housing unit edge network 12 may be connected via a network 8 to a system controller 4. In the absence of connectivity via the communication mechanism 210, the control hub 14 may operate temporarily to store messages locally 212 for later retries.

In the following paragraphs, reference will be made to "MQTT" which is originally an initialism of MQ Telemetry Transport. MQTT is a lightweight, publish-subscribe, machine to machine network protocol for message queue/message queuing service. It is designed for connections with remote locations that have devices with resource constraints or limited network bandwidth, such as in the Internet of Things (IoT).

The control hub 14 communicates with the system controller 4, or the control hub 14 may communicate with a MQTT message upload or synchronization service associated with the system controller 4, to upload or synchronize messages therewith (block 214). Because these messages may cause the system controller 4 to take further actions or may be propagated to other devices by the system controller 4 (such as a resident device 10, management device 6, or to an aspects of a multi-family housing unit edge network 12), further message regularization, translation, or structuring may be desired. As such, a server message filter may be applied (block 216) by the system controller 4. The regularized message may then be further filtered to be appropriate for a specific recipient device. For instance, a message directed to an effector 18 that is a door lock will have different fields and the fields will contain different data, than a message directed to a resident device 10 such as a smartphone application. As such, the system controller 4, control hub 14, and/or a combination thereof may apply a message/device filter layer (block 218) to structure the fields and contained data appropriately for a destination.

Depending on the destination, the message/device filter layer (block 218) may filter messages differently, for example, messages may be filtered for communication with a smart lock, a thermostat, a leak sensor, a motion sensor, a contact sensor, a garage door controller, a light dimmer, a switch, an electrical plug (e.g., outlet) or the like.

For example, a message to or from a lock may be filtered so as to contain four fields containing data. For instance, a low battery field 220 may contain data corresponding to whether a battery of the lock is or is not low. If the field contains data corresponding to a battery of a lock being low, then a device setting is checked (block 222) to determine whether which, if any of subsequent actions are permitted for the specific smart lock. For instance, a work order may be created (block 224). Different devices associated with different users may receive a corresponding notification, such as for a notification for property management staff (block 226), a notification for a resident (block 228), and/or a notification for maintenance personnel (block 230). Moreover, an access code may be generated for maintenance personnel to use to gain entry to/via the smart lock (block 232). Notification settings may be checked (block 234) for each of the management staff, resident, and/or maintenance personnel and notifications may be provided such as by email (block 236), SMS (block 238), and/or push messages (block 240). The work order creation may also cause the system to indicate that further actions should be taken depending on whether a housing unit associated with the smart lock is occupied or vacant (block 242). In each instance, different property activity (block 244) may be instructed via devices such as a management device 6 and different resident activity (block 246) may be instructed via devices such as a resident device 10.

An access activity field 248 may contain data corresponding to a historical log of access attempts to the smart lock. For instance, the access activity field 248 may include an indication of whether access for a user is added (block 250), removed (block 252), used (block 254), or failed (block 256) for a specific smart lock. Various other data may be provided or stored such as a characterization of access type (block 258) and an indication that further action should be taken depending on access type, an indication of whether a housing unit is occupied or vacant (block 260), and an indication that further actions should be taken depending on whether the housing unit is occupied or vacant. In each instance, different property activity (block 262) may be instructed such as via devices such as a management device 6 and different resident activity (block 264) may be instructed via devices such as a resident device 10. Notifications may be provided for a resident (block 266). Notification settings may be checked (block 268) for a resident device 10 and notifications provided such as by email (block 270), SMS (block 272) and/or push notification (block 274).

A tamper alarm field 276 may contain data corresponding to an affirmative or negative indication of whether the smart lock has been tampered with. In response to containing an indication that the smart lock has been tampered with, then various device settings must be evaluated (block 278). In response to being permitted via the device settings, one or more indication that further action should be taken may be generated. For instance, different property activity (block 280) may be instructed such as via devices such as a management device 6 and different resident activity (block 282) may be instructed such as via devices such as a resident device 10. Notifications may be provided via either or both a management device 6 and/or a resident device 10. Notification settings may be checked (block 284) and notifications provided such as by email (block 286), SMS (block 288) and/or push notification (block 290).

A device jammed field 292 may contain data corresponding to an affirmative or negative indication of whether the smart lock has jammed. In response to containing an indication that the smart lock has jammed, then various device settings must be evaluated (block 294). In response to being permitted via the device settings, one or more indication that further action should be taken may be generated. For instance, different property activity (block 296) may be instructed such as via devices such as a management device 6 and different resident activity (block 298) may be instructed such as via devices such as a resident device 10. Notifications may be provided via either or both a management device 6 and/or a resident device 10. Notification settings may be checked (block 300) and notifications provided such as by email (block 302), SMS (block 304) and/or push notification (block 306).

Similar type notifications and notification rules may be generated for different types of devices associated with the message/device filter layer. For instance for a thermostat, data fields may include fields having data corresponding to a mode or temperature setting (block 308), a temperature alert (block 310) for temperatures that are outside a determined range, a humidity alert (block 312) for humidities that are outside a determined range, a schedule field (block 314) containing data corresponding to an operating schedule for an HVAC system associated with the thermostat, and a low battery field (block 316) having data corresponding to an alert similar to low battery field 220 discussed previously.

Yet further similar type notifications and notification rules may be generated for different types of devices associated with the message/device filter layer. For instance for a leak sensor, data fields may include fields having data corresponding to a whether a leak is or is not occurring and potential data characterizing a magnitude of a leak (block 318). Data fields may include a low battery field (block 320) having data corresponding to an alert similar to low battery field 220 discussed previously.

Figure 3:
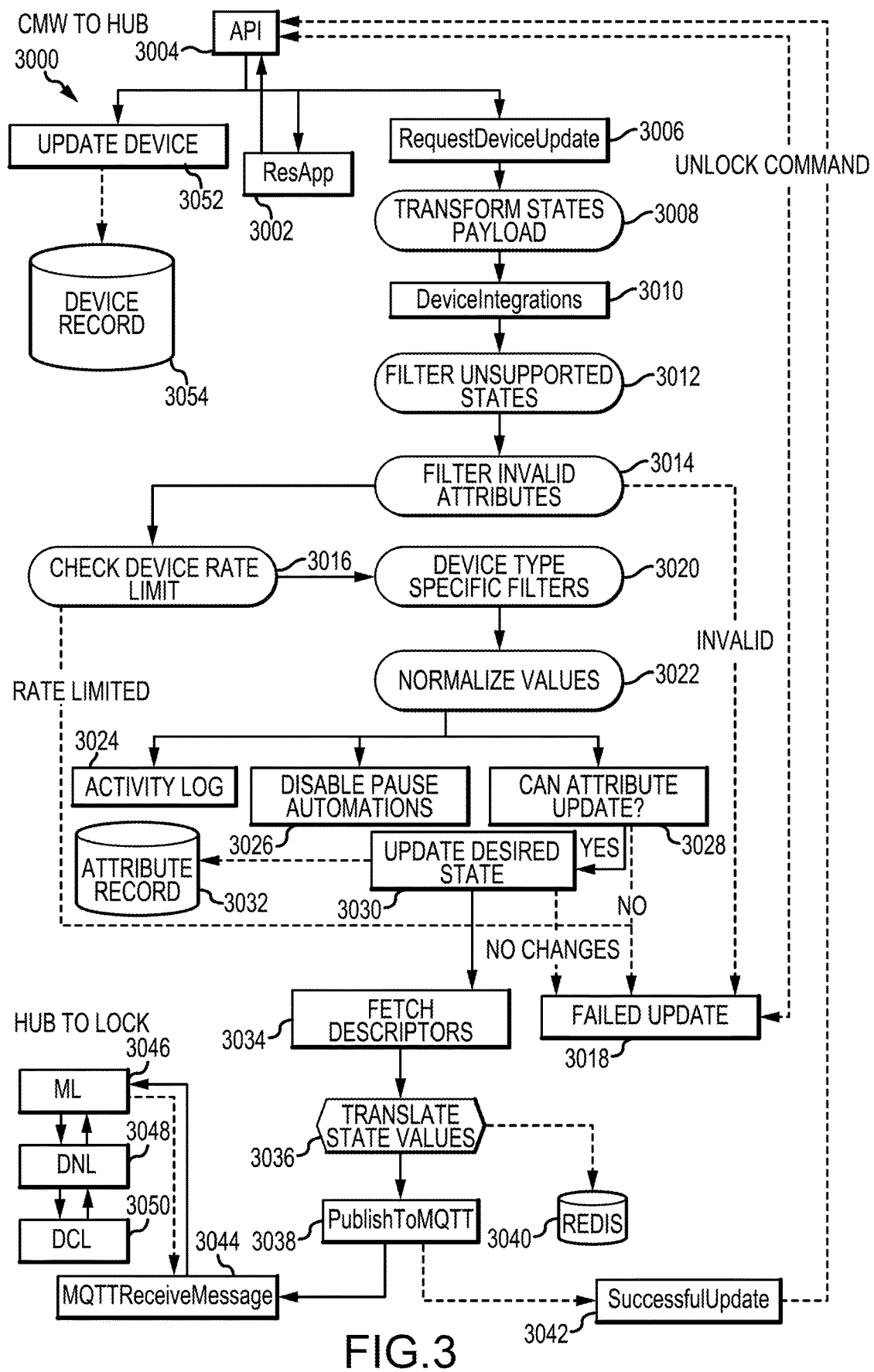
FIG. 3 illustrates aspects of communication between a system controller and a control hub of the system of FIG. 1, in accordance with various embodiments.

In various embodiments, a combination of the system controller 4, control hub 14, and/or other features of multifamily housing unit edge network 12 interoperate to provide proper instructions to effectors 18 and/or management devices 6 and/or resident devices 10 based on data sensed by the sensor 16. With continuing reference to FIG. 1, and with reference now to FIG. 3, one example method 3000 of communicating from a system controller 4 to a control hub 14 is described. A resident may use a resident app (Res App 3002) to send an "unlock command." In this instance a resident of an apartment wants to unlock a smart lock of that apartment. The unlock command travels from the resident device 10 to the system controller 4 via the network 8. An API 3004 in the system controller 4 receives the unlock command, which goes through validation steps (e.g., Request Device Update 3006) to verify things such as (i) the user is valid, (ii) the user is authorized to control this lock, (iii) any entered code is a correct code, and the like. The payload is retrieved from the API request associated with the unlock command and the payload is transformed into a standard payload format (transform states payload 3008) for the rest of the system, regularizing the data. The control hub 14 and/or system controller 4 may interoperate to map the data to a record of device integrations 3010, meaning that the data in the regularized format is received by a control hub 14 and further processed for a specific smart lock. Any unsupported states are filtered (filter unsupported states 3012). Any invalid attributes (e.g., data) associated with a state is filtered (filter invalid attributes 3014). At this point, the message now contains data of a type expected by the smart lock, and the values of the data are within expectations of the smart lock. If no data is remaining, or the message is otherwise excessively malformed, the system returns a message to the resident device 10 indicating that the update (e.g., the instruction to unlock a smart lock) failed 3018.

The communication method also includes checking a device rate limit 3016. Due to potential asynchronies in a network communication environment, as well as user behavior or device malfunctions, repeated messages may be received at an excessive rate, which may harm physical effectors 18, or harm network functionality due to flooding or overloading with messages. For instance, a garage door opener can only respond to messages at a rate consistent with movement of the garage door, whereas a door lock can respond to messages at a different rate. If rate limiting is needed, the system returns a message to the resident device 10 indicating that the update (e.g., the instruction to unlock the smart lock) failed 3018.

A further set of filters (device type specific filters 3020) is applied. For instance, filters that are specific to the device being controlled (such as the type and specific model of smart lock) are applied. For instance, states such as "raise the temperature" would be filtered since this is a thermostat state, not a smart lock state. Attributes such as "Set Device to: OFF" would be filtered, even if in a known field appropriate for a lock (e.g., a lock/unlock status field) because these attributes are not valid for the smart lock which is not a device that is to be remotely turned off. The values of the data in the fields of the message are normalized to a format appropriate for the device (normalize values 3022), such as floating point numbers being converted to integers, or fields truncated or concatenated as desired, etc.

Multiple events may occur at this point, a properly formed unlock messages with proper data in proper fields now being confirmed. For instance, the unlock event can be stored to an activity log for later audit, or for later processing in an asynchronous manner (activity log 3024). Automations of other smart home features in a user's apartment may have been paused because the user was away. Unlocking of the smart lock indicates that the user has returned to the apartment, so any paused automations are disabled so that the automations resume (disable pause automations 3026). Finally, the smart lock is evaluated to confirm whether the attribute being changed (in this case, unlocking the smart lock) can be changed (e.g., can attribute update? 3028). In response to an inability to update, such as because the smart lock has no power, the system returns a message to the resident device 10 indicating that the update (e.g., the instruction to unlock the smart lock) failed 3018. In response to an ability to update, instructions are provided to the smart lock to update its state consistent with the instruction (update desired state 3030). In this instance, that means to transform from locked to unlocked state. The updated state is recorded to an attribute record (block 3032). If the updated state is not generated for any reason, the system returns a message to the resident device 10 indicating that the update (e.g., the instruction to unlock the smart lock) failed 3018. In response to an ability to update, and a corresponding change, then the precise messaging format expected by this smart lock is retrieved (fetch descriptors 3034), and the message is translated to that precise message format (translate state values 3036). This message is then published to MQTT 3038 and stored in Redis 3040.

Redis ("Remote Dictionary Server") is an open-source in-memory storage, used as a distributed, in-memory key—value database, cache and message broker, with optional durability. Because it holds all data in memory and because of its design, Redis offers low-latency reads and writes, making it particularly suitable for use cases that require a cache.

Storing a message in Redis allows the system to later also store, in association with this message, any additional meta data or fields that are later returned from the smart lock after unlocking but are not appropriate for passing up through the filters and layers for transforming in to a structure suitable for the system controller 4, management device 6, and/or resident device 10.

Publishing the message to MQTT is followed by MQTT receiving the message (MQTT Receive Message 3044), which then provides the message to the smart lock itself. The message is received by a layer of the smart lock protocol (Messenger Layer (ML) 3046) that consumes the message. The messenger layer (ML) 3046 is the hub communication layer responsible for sending messages to/from a hub or a server and retrying or storing messages for hubs that may be offline. This layer is responsible for hub-to-server communication. The messenger layer provides the message to the layer of the smart lock protocol that controls operation of the lock (Data Normalization Layer ("DNL") 3048).

The data normalization layer then interacts with the RF transceiver and/or motor controller layer (Device Communication Layer (DCL) 3050) for further communication with aspects of the devices. The device communication layer 3050 handles communication to devices, such as implementing short range communication, Z-Wave protocols or other mechanisms. While various layers are discussed herein for ease of explanation, one may appreciate that different system architectures and different protocol architectures may be implemented by the systems, devices, and methods herein.

In response to publication to MQTT proceeding successfully, the system returns an indication that the lock updated successfully (e.g., unlocked) (successful update 3042), which then passes up to the API for dissemination to other systems and components such as the system controller 4, management device 6, and/or resident device 10. In various embodiments, the device is updated 3052 and the update is recorded to a device record 5054.

Figure 4:
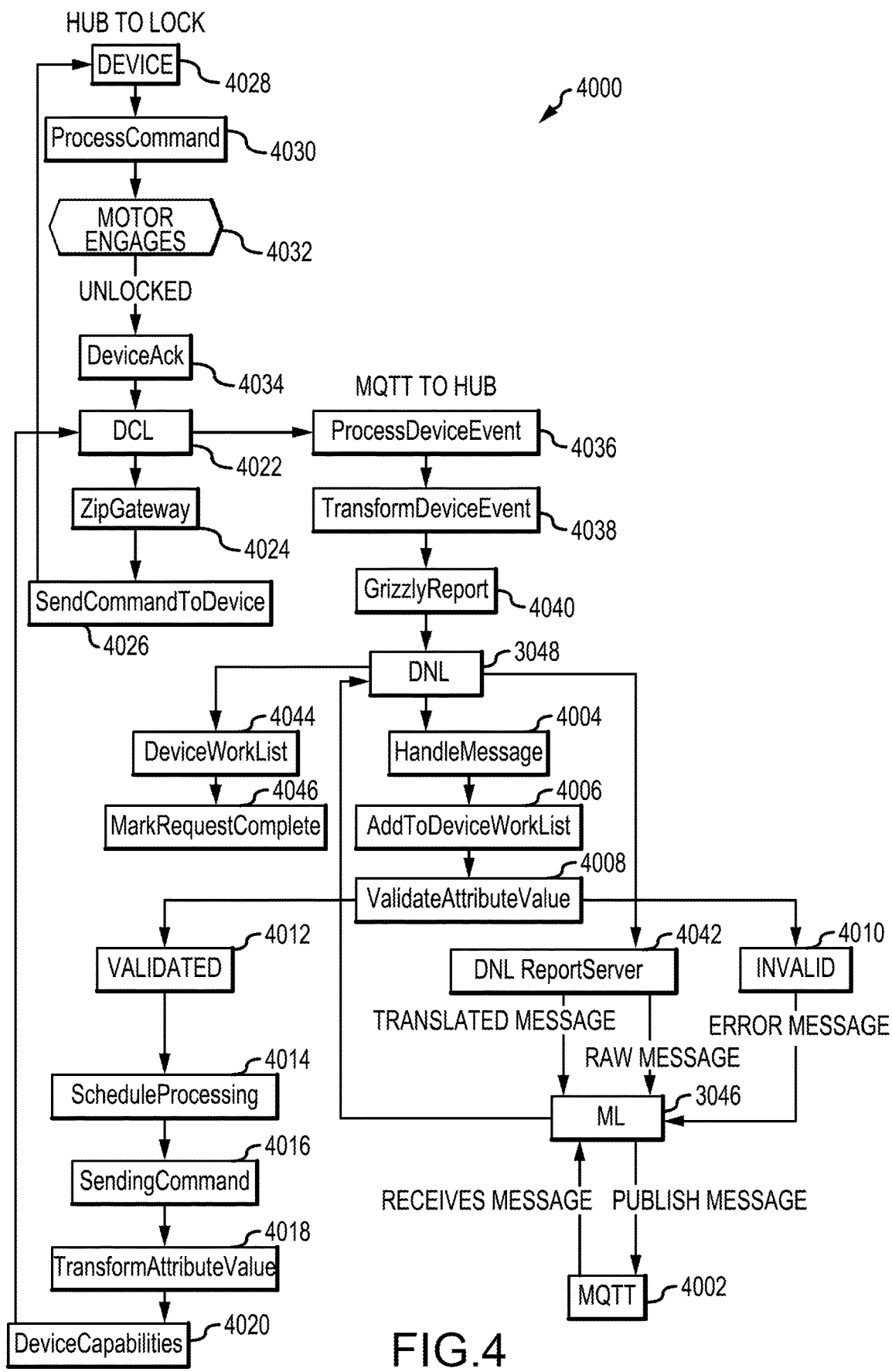
FIG. 4 illustrates aspects of an example communication scenario to operate an effector of the system of FIG. 1, in accordance with various embodiments.

Turning now to FIG. 4, but with periodic reference to FIG. 1, a diagram 4000 illustrates in greater detail the interactions of the control hub 14, MQTT service associated with the system controller 4 and/or control hub, and an effector 18 that is a smart lock, in this example. An MQTT service 4002 publishes a message to a control hub. The control hub sees the message as a subscriber to the MQTT service. The message is received by a layer of the smart lock protocol (Messenger Layer (ML) 3046) that consumes the message and provides it to the layer of the smart lock protocol that controls operation of the lock (DNL 3048).

This so-called "data normalization layer (DNL)" performs several further tasks. The data normalization performs device attribute transformation. This layer normalizes or abstracts devices, having data associated with capabilities of devices and how to interact with different devices. The data normalization layer performs some further translation or regularization of the message, the fields of the message, and the content of the fields so that the payload is in a form appropriate for the specific effector 18 (handle message 4004).

The message is added to an internal queue on the control hub 14 called the work list (add to device work list 4006). The work list further protects against inadvertent overload of a network because the work list is effective to rate limit certain messages associated with operation of the device. The work list steps provide some delay to messages from a control hub 14 to a device so that inadvertent repeated messages are ameliorated. As the work list is processed, further validation steps check the message to verify the message as having fields and the fields having data both of which are appropriate for the specific effector 18 (validate attribute value 4008). In response to a message having at least partial invalidity (e.g., a field being improper for the specific effector 18 and/or a data of a field being improper for the specific effector 18) (invalid 4010), the message is determined to be invalid, and an error message returned to the layer of the smart lock protocol (messenger layer (ML) 3046) that consumes the messages and/or interacts with outside devices.

In response to the message being valid (block 4012), the message is scheduled for processing (schedule processing 4014), a command is sent based on the message (sending command 4016), any content of the command that should be reformatted or transformed to be appropriate for the specific effector 18 is reformatted or transformed (transform attribute value 4018), and in response to this transformation or reformatting, is now consistent with the capabilities of the specific effector 18 (device capabilities 4020). A RF layer protocol (device communication layer (DCL) 4022) may send the transformed or reformatted command to a gateway device (zip gateway 4024) which transmits the command to the specific operative portion of the effector 18 to be driven (send command to device 4026). The device receives this command (device 4028) and processes the command (process command 4030), causing a motor to be energized (motor engages 4032) and the smart lock of the effector 18 automatically unlocked. The device then sends an acknowledgement message (device ack 4034) back to the RF layer protocol (device communication layer (DCL) 4022) for propagation back up through the layers of the protocol.

The acknowledgement message associated with a completed device event, such as unlocking, is processed (process device event 4036) and the data associated with the acknowledgement of completion received in device ack 4034 is transformed and/or regularized (transform device event 4038) into a standard format expected by other system components. This acknowledgement is a part then of a report (DCL report 4040) returned to the data normalization layer. The data normalization layer then accesses the work list (device work list 4044) and updates the work list to make the request as having been successfully completed and not needing any reattempt (mark request complete 4046).

The data normalization layer creates a further report (DNL report server 4042). This report, importantly, has two components. In one component, a transformed and regularized message in a standard format expected by other system components is returned to the layer of the smart lock protocol (messenger layer (ML) 3046) that consumes the messages and/or interacts with outside devices. In another component, a raw message is returned to the layer of the smart lock protocol (messenger layer (ML) 3046) that consumes the messages and/or interacts with outside devices. This layer may publish a message to the MQTT service 4002. However, by having both the normalized and raw format, the raw format may also be added to an activity log for record keeping or later further processing.

Figure 5:
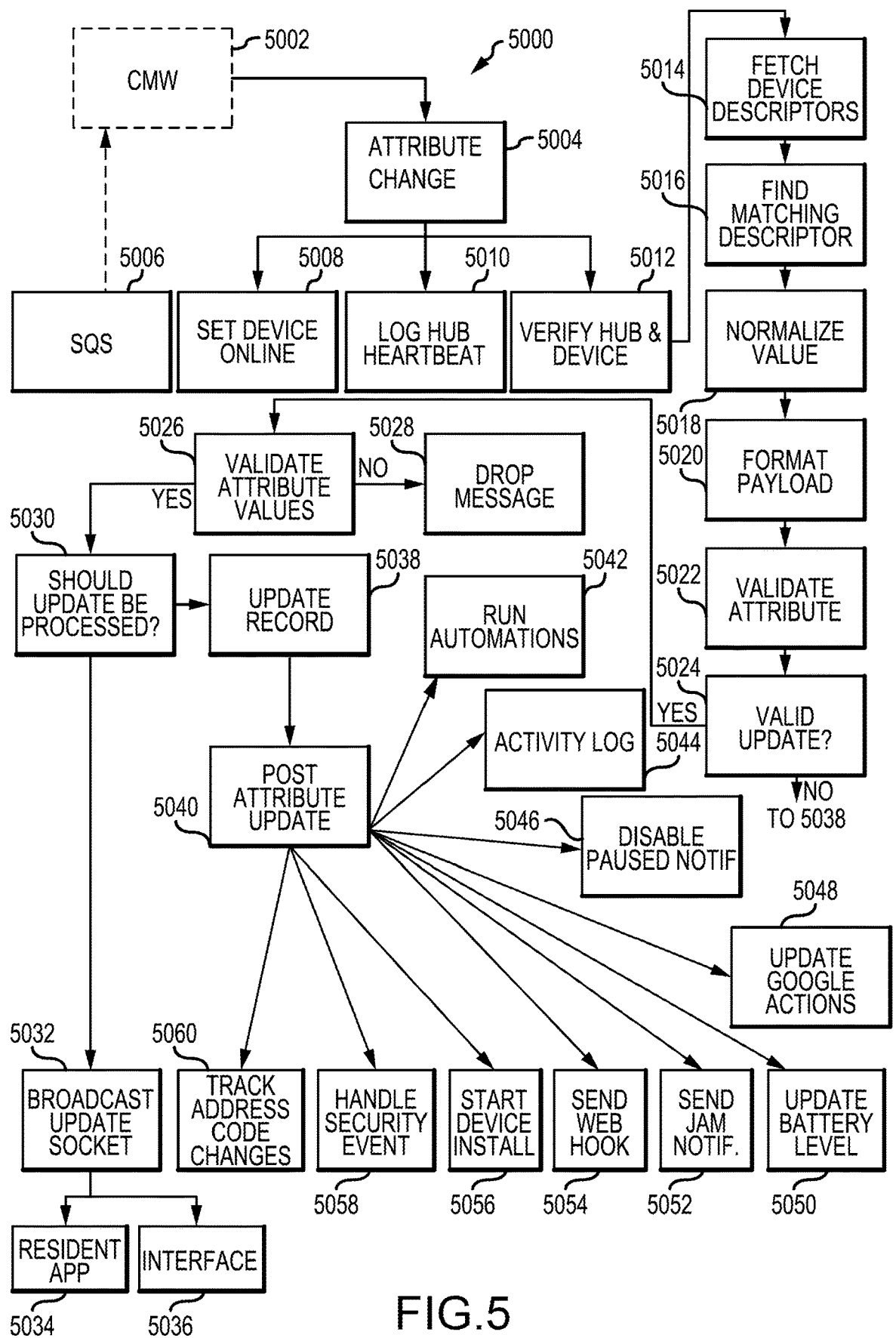
FIG. 5 illustrates aspects of an example communication scenario in which the system controller interacts with a resident device and a management device of the system of FIG. 1, in accordance with various embodiments.

Turning now to FIG. 5, but with continuing reference to FIG. 1, a diagram of a communication method 5000 that illustrates various aspects of communication from a system controller 4 to a resident device 10 or a management device 6 as well as from the system controller 4 to a control hub 14 are detailed. For instance, a community manager web (CMW) 5002 may include monitoring for messages propagating back to the system controller 4 that correspond with an attribute change. These messages may originate from an SQS 5006. An attribute change may include an effector 18 operating such as to lock or unlock a lock. An attribute change may include a sensor 16 operating to provide a changed or updated sensed value. An attribute change may also include changes to system architecture such as addition or deletion of a multi-family housing unit edge network 12 or changes to a multi-family housing unit edge network 12, such as the addition or deletion of a sensor 16 or the addition or deletion of an effector 18. Notably, while CMW 5002 is illustrated between SQS 5006 and attribute change 5004, in various embodiments, CMW 5002 is not logically separate, but is rather a collection of various logical boxes illustrated in FIG. 5. Thus, CMW 5002 is illustrated as an open box in dashed lines, rather than a closed box in solid lines. Thus, one or more of the other aspects shown in FIG. 5 may be understood to be subcomponents of CMW 5002, although for ease of reference these aspects are depicted as separate boxes and/or may be depicted as connected to CMW 5002.

The communication method 5000 may include detecting an attribute change 5004 such as in response to receipt of an associated message. The message may be provided from SQS 5006. The method may also include receiving data at the CMW 5002 from an SQS 5006, such as in response to polling, and subsequently detecting the attribute change 5004 from or in connection with such data. And, as mentioned, CMW 5002 may be illustrated as a separate box, but may be a logical collection of other boxes depicted in FIG. 5 and/or may subsume or be subsumed therein.

SQS 5006 is a simple message queuing service provided by Amazon Web Services that allows for the queueing and subsequent processing of messages from hubs and devices. In this instance, the hub will publish a message via MQTT, and that message may be placed in a queue for the application (CMW 5002) to consume and perform some action with.

Moreover, upon detecting this attribute change, a variety of response may follow. For instance, the simple presence of a communication from a device, regardless of what the attribute change represents, will serve to confirm that a device is online. Thus, the system controller 4 may set the status of the device to an online status in a record accessible by other system elements (block 5008). In this manner, the system controller 4 may process messages and/or generate error messages associated with the device being online. The system controller 4 may log that a control hub 14 by which the attribute change was communicated to the system controller 4 is in present communication with the system controller 4 (e.g., log hub heartbeat 5010). This facilitates dynamic awareness by the system controller 4 of the network architecture and of the status of different multi-family housing unit edge networks 12. Because network 8 may be congested or connected intermittently, this ongoing presence awareness with respect to each control hub 14 of each multi-family housing unit edge network 12 facilitates generation of error messages, workorders, and the like by the system controller 4. For instance, if no recent communication from a particular control hub 14 has been received, the system controller 4 may generate a workorder for a maintenance person to check an apartment associated with the control hub 14 for electricity or for damage. Finally, the system controller 4 may perform operations related to the content of one or more message associated with the detected attribute change. For instance, the system controller 4 may verify that the control hub 14 and the device associated with the attribute are present and connected (block 5012).

In response, the system controller 4 may fetch device descriptors (block 5014). Device descriptors corresponding to a mapping of attribute content or fields to regularized state values. For instance, one brand of smart lock might return "Lock Secured" when a lock is in the locked status and another brand of smart lock might return "Locked" when a lock is in the locked status. The system controller 4 ingests these messages and regularizes them to a common state value that can be understood by other system components, such as setting a Boolean variable field named "LOCKED" to hold a Boolean "TRUE" value corresponding to both "Lock Secured" and to "Locked." Thus, the system controller 4 fetches device descriptors associated with the specific type of effector 18 (block 5014), then finds a matching descriptor in the returned set of device descriptors (block 5016), and then normalizes the value to correspond to a common state value (block 5018). Having been normalized, the payload of the value (e.g., the content of a variable field) is formatted (block 5020), and that attribute is validated (block 5022).

Validating an attribute means determining not only that a value is properly formed and data in the variable field of the value is properly formed, but that the value and data are appropriate for the effector 18. For instance, a Boolean variable field named "LOCKED" holding a Boolean "TRUE" value might be regularized to a common state value but would be improper if associated with an effector 18 that is a thermostat. In response to the attribute being validated (block 5022), any changes to the attribute from a prior known state being appropriate state changes for the attribute type (validate attribute 5022), and also the variable in that attribute being valid (block 5026, the process of updating the variable proceeds. Otherwise, the message is dropped (block 5028) as improper.

A further verification check occurs to determine whether an update to an attribute should be processed (block 5030), even if the attribute, state change of the variable in the attribute, and the variable in the attribute all are proper. For instance, if an update causes a new variable to equal the prior variable value, then there is no need process the update, and the update can be passed to a broadcast update socket 5032 for propagation to a resident device 10 (resident app 5034) and a management device 6 (interface 5036). In response to an update being needed, then a database record of the system controller 4 is updated (block 5038). Notably, while interface 5036 may be a browser session operating on a management device 6, interface 5036 may be a smartphone application, or any mechanism for electronic communication.

Afterward, various post-attribute-update (block 5040) tasks may be performed. One or more such task may be performed from time to time. For instance, following tasks may include tracking access code changes, such as for a smart lock (block 5060) or handling security events (block 5058), or starting a device installation process (block 5056) or sending a web hook (block 5054), or sending a jam notification for a jammed smart lock (block 5052), or for updating a stored battery level measurement for a sensor 16 or an effector 18 (block 5050). In block 5054, webhooks may be used to provide real time notifications for third party applications (such as property management systems). This may be for a variety of use cases including (but not limited to): access codes added or removed from a lock; device offline/online; hub offline/online; low battery alerts; sirens or leak alerts; and/or prospects and tour notifications.

Figure 6:
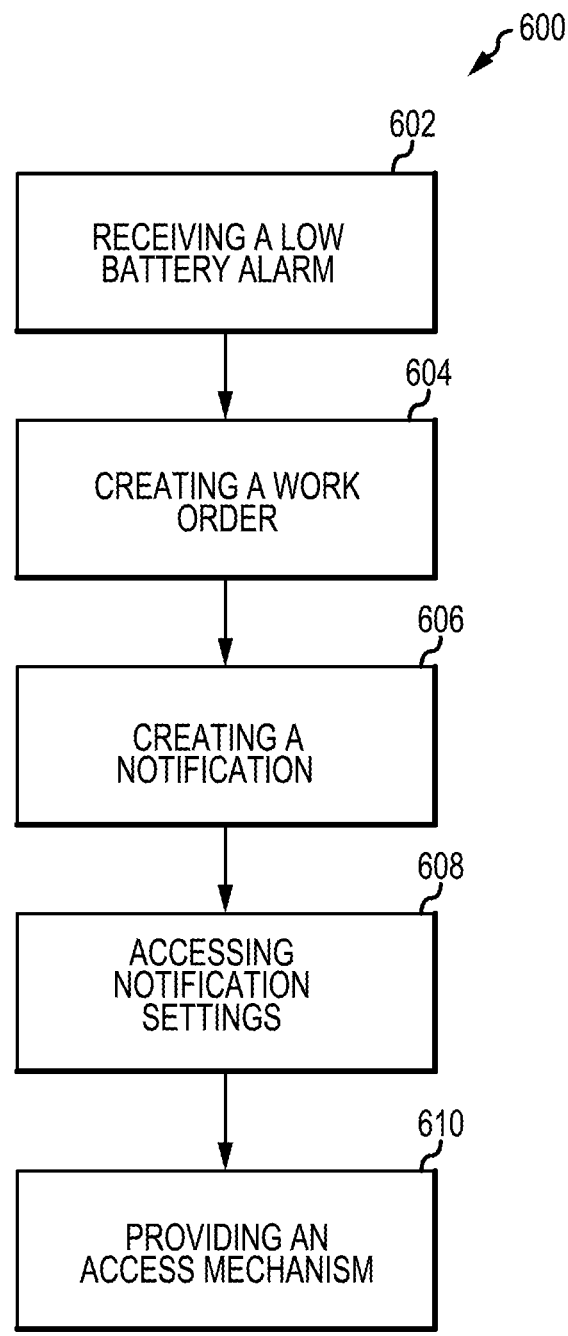
FIG. 6 illustrates a flowchart for a method of automatically providing physical access by a system of FIG. 1 to a housing unit in response to a low battery alarm generated by a sensor in the housing unit, in accordance with various embodiments.

FIG. 6 illustrates a flowchart for a method 600, according to an embodiment. More specifically, FIG. 6 illustrates a flowchart for a method of automatically providing physical access by a system of FIG. 1 to a housing unit in response to a low battery alarm generated by a sensor 16 in the housing unit. Referring to both FIGS. 1 and 6, the method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 2 (FIG. 1) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as a system controller 4, a management device 6, a resident device 10, a control hub 14, a sensor 16, and/or an effector 18. The processing module(s) can be similar or identical to the processing module(s) of a computer, having processors and memories.

In many embodiments, method 600 can comprise an activity 602 of receiving a low battery alarm. A low battery alarm can be received from a number of different devices. For example, a low battery alarm can be received from one or more sensor 16 or effector 18 when running in a battery only mode. In some embodiments, a plurality of low battery alarms can be received. In these embodiments, the plurality of alarms can be received from a plurality of sensors 16 or effectors 18 and/or multiple low battery alarms. In various embodiments, a plurality of low battery alarms can be deduplicated by device, such as through implementation of the work list discussed in connection with FIG. 6. In various embodiments, receiving a plurality of alarms from one sensor 16 or effector 18 can indicate that the sensor 16 or effector 18 is malfunctioning. For example, the sensor 16 or effector 18 can be stuck in an infinite loop of alarming and/or a battery or the sensor 16 or effector 18 can be failing, thereby triggering successive battery alarms. In these embodiments, the sensor 16 or effector 18 can be flagged as malfunctioning by a recipient of the battery alarms (e.g., control hub 14 and or system controller 4).

In many embodiments, method 600 can comprise an activity 604 of creating a work order. In many embodiments, a work order can be created on a web server (e.g., system controller 4) for distribution. Therefore, in some embodiments, activity 604 can comprise transmitting one or more low battery alarm messages to a web server (e.g., system controller 4). In various embodiments, a low battery alarm can be modified (e.g., disaggregated, queued, transformed and regularized, etc.) as described above.

Turning now to FIG. 7, an exemplary work order 700 is shown. While work order 700 is displayed as being a portion of a website, it should be understood that a work order can comprise a number of different formats. For example, a work order could be displayed in a software application, in an email, a text message, or some other form. In many embodiments, work order 700 can be manually or automatically generated.

Returning again to FIG. 6 and periodically referring also to FIG. 1, in many embodiments, method 600 can comprise activity 606 of creating a notification. In many embodiments, a notification can be created on a web server (e.g., system controller 4) for distribution. In some embodiments, a notification can be sent to a resident device 10 operated by an occupant of a unit serviced by a multi-family housing unit edge network 12 having the control hub 14 that originated the alarm.

Figure 8:
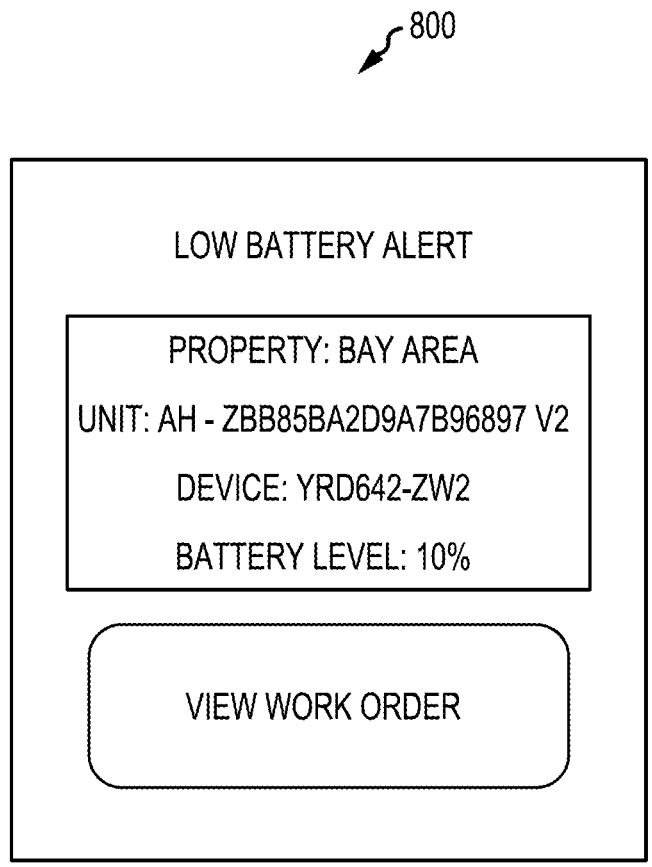
FIG. 8 illustrates an example alert generated in connection with the method of FIG. 6 for display on the resident device or the management device of the system of FIG. 1, in accordance with various embodiments.

Turning now to FIG. 8, an exemplary notification 800 is shown. While notification 800 is displayed as being a portion of a website, it should be understood that a work order can comprise a number of different formats. For example, a notification could be displayed in a software application, in an email, a text message, or some other form. In many embodiments, notification 800 can be manually or automatically generated. In various embodiments, one or more notification templates can be used to create a notification. In these embodiments, attributes and/or settings of the device can be used to populate the template before transmission. For example, notification sent via text message can be using a format that includes a device name taken, a unit number, a property name, or other relevant attributes of the device.

Returning now to FIGS. 1 and 6, in many embodiments, method 600 can comprise activity 608 of accessing notification settings. In various embodiments, activity 608 can be performed after and/or in response to activity 606. In some embodiments, notification settings can be stored within a multi-family housing unit edge network 12 (e.g., on control hub 14). In these or other embodiments, notification settings can dictate what type and the contents of a notification. For example, notification settings can dictate that an SMS be sent to an occupant, an email be sent to maintenance, and a push notification to a property manager.

In many embodiments, method 600 can comprise activity 610 of providing an access mechanism. In various embodiments, activity 610 can be performed at the same time as and/or after activity 608. In some embodiments, an access mechanism can be provided to a recipient of a notification in the notification. For example, an email sent to maintenance can include a unique code that can be used to enter a unit subject to a work order. As another example, an RFID transceiver can be configured to interact with a specific sensor, thereby allowing whoever possesses the transceiver to pass through locks actuated by the sensor.

Thus, and with reference to the complete set of FIGS. 1-8, it is now convenient to discuss various additional implementations of the systems and methods herein. For instance, in various embodiments, a system 2 may include a system controller 4 and a control hub 14. Included one of the system controller 4 and control hub 14 or distributed across the combination of the system controller 4 and the control hub 14, the system 2 may have one or more processor and one or more non-transitory computer readable storage device storing computer instructions configured to run on the one or more processors and cause the one or more processors to perform various operations. The system 2 may also have one or more edge device such as a sensor 16 or an effector 18. The one or more processors may receive a low battery alarm from the edge device. The one or more processors may create a work order for the edge device. The one or more processors may create a notification pursuant to one or more notification settings. The one or more processors may provide an access mechanism for the edge device.

Other features may also be included. In some instances, the low battery alarm is received within an edge network (e.g., a multi-family housing unit edge network 12) and the work order is created outside the edge network. The notification may be created using a notification template. The notification template may be is populated using an attribute of the edge device discovered in response to receiving the low battery alarm.

In various embodiments, the receiving the low battery alarm includes receiving a plurality of low battery alarms from only one edge device. In various embodiments, the receiving the low battery alarm includes determining that the edge device is malfunctioning. The creating the work order may include adding a notation in the work order to repair or replace the edge device.

In various embodiments, the receiving the low battery alarm includes receiving a plurality of low battery alarms from only one edge device and deduplicating the plurality of low battery alarms. The computing instructions may be further configured to run on the one or more processors and cause the one or more processors to transmit only one low battery alarm of the plurality of low battery alarms to a web server (e.g., system controller 4).

The computing instructions may be further configured to run on the one or more processors and cause the one or more processors to perform various aspects. For instance, in response to the receiving the low battery alarm, the one or more processors may initiate a script for a recovery algorithm and register the edge device in an edge network managed by the system after completing the recovery algorithm. The computing instructions may be further configured to run on the one or more processors and cause the one or more processors to perform: in response to the receiving the low battery alarm, querying the edge device for device attributes of the edge device. The computing instructions may be further configured to run on the one or more processors and cause the one or more processors to perform: in response to the receiving the low battery alarm, changing a local record of a setting for the edge device. In various embodiments, the edge device comprises a smart lock in a multi-family housing complex.

A method is also provided. The method may be implemented via execution of computing instructions configured to run at one or more processors and configured to be stored at non-transitory computer-readable media. The method may include receiving a low battery alarm from an edge device. The method may include creating a work order for the edge device. The method may include creating a notification pursuant to one or more notification settings. Finally, the method may include providing an access mechanism for the edge device.

The method may have one or more additional features. For instance, in some instances of the method, the low battery alarm is received within an edge network and the work order is created outside the edge network. In various embodiments, the notification is created using a notification template. In various embodiments, the notification template is populated using an attribute of the edge device discovered in response to receiving the low battery alarm.

The receiving the low battery alarm may have other aspects. For instance, the receiving may include receiving a plurality of low battery alarms from only one edge device and determining that the edge device is malfunctioning. The creating the work order may include adding a notation in the work order to repair or replace the edge device.

In various embodiments, the receiving the low battery alarm includes receiving a plurality of low battery alarms from only one edge device and deduplicating the plurality of low battery alarms. The computing instructions are further configured to run on the one or more processors and cause the one or more processors to perform various aspects. For instance, the processors maybe caused to transmit only one low battery alarms of the plurality of low battery alarms to a web server.

In various embodiments, the method also includes, in response to the receiving the low battery alarm, initiating a script for a recovery algorithm and registering the edge device in an edge network managed by the system after completing the recovery algorithm. The method may include, in response to the receiving the low battery alarm, querying the edge device for device attributes of the edge device. The computing instructions may be further configured to run on the one or more processors and cause the one or more processors to perform in response to the receiving the low battery alarm, changing a local record of a setting for the edge device. The edge device may be a smart lock in a multi-family housing complex.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not for purposes of limitation.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Use of 'a' or 'an' before a noun naming an object shall indicate that the phrase be construed to mean 'one or more' unless the context sufficiently indicates otherwise. For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages. A "processor" may include hardware that runs the computer program code. Specifically, the term 'processor' may be synonymous with terms like controller and computer and should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system may allow users and/or electronic devices (collectively, "users") to access data, and receive updated data in real time from other users. The system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g. non-standardized) that the information was input by the user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account, user, device, etc. The system may include a filter on a local computer and a filter on a server.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling") and/or a radio frequency (RF) communications protocol. In this regard, "electronic communication," as used herein, includes wired and wireless communications (e.g., Bluetooth, Bluetooth LE, NFC, TCP/IP, Wi-Fi, etc.).

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, data may refer to partially or fully structured, semi-structured, or unstructured data sets including "big data", which may include millions of rows and hundreds of thousands of columns.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, public and private keys, and/or the like.

As used herein, a "script" refers to instructions for a computing device to carry out one or more tasks automatically. As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, personal internet device, online communications, satellite communications, offline communications, wireless communications, transponder communications, local area network (LAN), wide area network (WAN), virtual private network (VPN), networked or linked devices, keyboard, mouse, and/or any suitable communication or data input modality. Moreover, although the system may be described herein as being implemented with TCP/IP communications protocols, the system may also be implemented using IPX, APPLETALK®, IPv6, NetBIOS, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" or "cloud computing infrastructure" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. Reference to a "device" or processor or memory or the like may include cloud resources, non-cloud resources, or combinations of cloud and non-cloud resources.

Computer programs (also referred to as computer control logic) are stored in main memory and/or secondary memory. Computer programs may also be received via communications interface. These computer program instructions may be loaded onto a general purpose computer, special purpose computer, controller, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer, controller, or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor or controller, causes the processor or controller to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment (e.g., an internet-based driving command system), an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, solid state storage media, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

In various embodiments, components, modules, and/or engines of the systems may be implemented as applications or apps. Apps are typically deployed in the context of a mobile operating system, including for example, a WINDOWS® mobile operating system, an ANDROID® operating system, an APPLE® iOS operating system, a BLACKBERRY® company's operating system, and the like. The app may be configured to leverage the resources of the larger operating system and associated hardware via a set of predetermined rules which govern the operations of various operating systems and hardware resources. For example, where an app desires to communicate with a device or network other than the mobile device or mobile operating system, the app may leverage the communication protocol of the operating system and associated device hardware under the predetermined rules of the mobile operating system. Moreover, where the app desires an input from a user, the app may be configured to request a response from the operating system which monitors various hardware components and then communicates a detected input from the hardware to the app.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows, and the descriptions thereof may make reference to user WINDOWS®/LINUX®/UNIX® applications, webpages, websites, web forms, prompts, etc. Practitioners will appreciate that the illustrated steps described herein may comprise, in any number of configurations, including the use of WINDOWS®/LINUX®/UNIX® applications, webpages, web forms, popup WINDOWS®/LINUX®/UNIX® applications, prompts, and the like. It should be further appreciated that the multiple steps as illustrated and described may be combined into single webpages and/or WINDOWS®/LINUX®/UNIX® applications but have been expanded for the sake of simplicity. In other cases, steps illustrated and described as single process steps may be separated into multiple webpages and/or WINDOWS®/LINUX®/UNIX® applications but have been combined for simplicity.

The computers discussed herein may provide a suitable website or other internet-based graphical user interface (GUI) which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PHP, Ruby, and/or PYTHON® programming languages.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In the context of the present disclosure, methods, systems, and articles may find particular use in connection with home automation for multi-family contexts. In various embodiments, other multi-unit automation scenarios are also contemplated, such as for commercial spaces in multi-unit commercial buildings or campuses.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A multi-unit access and control system for providing automation and control to multi-family housing complexes, the system comprising:
 a first multi-family housing unit edge network associated with a first apartment and having a first control hub, a first sensor, a first effector, and a second effector,
 wherein the first sensor and the first effector are connected to the first control hub by at least one of a (i) wireless network and (ii) a wired connection;
 the first control hub comprising a processor and one or more non-transitory computer-readable storage devices storing computing instructions configured to run on the processor and cause the processor to perform:
  receiving a fault condition alarm from the first sensor corresponding to a first fault condition detected by the first sensor;
  transmitting a fault condition alarm message to a system controller in response to the fault condition alarm;

after, and in response to, the transmitting the fault condition alarm message to the system controller, generating, by the system controller, a workorder containing data corresponding to the fault condition alarm and containing an access code from the first effector and transmitting, by the system controller the workorder to a management device connected to the system controller via a network;

transmitting a second command to the second effector comprising a first corrective instruction to cause the second effector to actuate, the actuating ameliorating the first fault condition, wherein the corrective instruction comprises a command to diminish the fault condition detected by the first sensor;

after, and in response to, the transmitting the fault condition alarm message to the system controller, receiving, from the system controller the access code for the first effector; and installing the access code on the first effector to allow a third-party to operate the first effector, wherein the operating the first effector provides physical access to the first sensor, receiving, by the first effector, an entry of the access code from the management device to the first effector, and performing the operating the first effector in response to the receiving.

2. The multi-unit access and control system of claim 1, wherein the first sensor is a smoke detector having batteries and the first fault condition is a depleted status of the batteries.

3. The multi-unit access and control system of claim 1, wherein the first effector is an electronic door lock selectably engageable to permit physical access to the first sensor in response to entry of the access code into a machine interface of the first effector.

4. The multi-unit access and control system of claim 3, wherein the machine interface is a wireless communication connection to a smartphone.

5. The multi-unit access and control system of claim 1, wherein the second effector is a water valve, the sensor is a water leak detector detecting a water leak, and wherein the corrective instruction comprises a command to close the water valve to ameliorate the water leak.

6. The multi-unit access and control system of claim 1, wherein the installing the access code on the first effector comprises storing in a local memory of the first effector, data corresponding to the access code.

7. The multi-unit access and control system of claim 1, wherein the installing the access code on the first effector comprises causing the first effector to query at least one of the system controller, the control hub, and a local memory of the first effector in response to an entry of an entered access code to compare the entered access code to the access code to selectively grant physical access to the first sensor in response to the entered access code matching the access code.

8. The multi-unit access and control system of claim 1, further comprising a first resident device connected to the system controller via a network, the first resident device configured to receive the fault condition alarm.

9. The multi-unit access and control system of claim 1, further comprising the management device connected to the system controller via the network, wherein the management device transmits, via a local short-range electronic connection to the first effector, the access code to the first effector to operate the first effector to provide physical access to the first sensor in response to physical proximity of the management device and the first effector being sufficiently near to permit the local short-range electronic connection.

10. The multi-unit access and control system of claim 1, further comprising the management device connected to the system controller via the network, wherein the management device transmits, to the system controller, an instruction, to cause the system controller to instruct the first effector to operate to provide physical access to the first sensor.

11. The multi-unit access and control system of claim 1, further comprising the management device connected to the system controller via the network, wherein the management device transmits, via the network, the access code to the system controller to cause the system controller to operate the first effector to provide physical access to the first sensor.

12. The multi-unit access and control system according to claim 1, further comprising:

a second multi-family housing unit edge network associated with a second apartment and having a second control hub, a second sensor, and a second effector, wherein the second sensor and the second effector are connected to the second control hub by at least one of a (i) wireless network and (ii) a wired connection, the second control hub comprising a processor and one or more non-transitory computer-readable storage devices storing computing instructions configured to run on the processor and cause the processor to perform:

receiving a second fault condition alarm from the second sensor;

transmitting a second fault condition alarm message to the system controller in response to the second fault condition alarm; and after, and in response to, the transmitting the second fault condition alarm message to the system controller, receiving, from the system controller, a second access code for the second effector;

installing the second access code on the second effector to allow the third-party to operate the second effector, wherein the operating the second effector provides physical access to the second sensor; and a management device connected to the system controller via a network, wherein the system controller further transmits both the access code and the second access code to the management device, wherein the management device transmits, via a local short-range electronic connection to the first effector, the access code to the first effector to operate the first effector to provide physical access to the first sensor in response to physical proximity of the management device and the first effector being sufficiently near to permit the local short-range electronic connection, and wherein the management device transmits, via a local short-range electronic connection to the second effector, the second access code to the second effector to operate the second effector to provide physical access to the second sensor in response to physical proximity of the management device and the second effector being sufficiently near to permit the local short-range electronic connection.

13. The multi-unit access and control system according to claim 12, wherein the second access code and the access code are different.

14. The system according to claim 1, wherein the first fault condition comprises a detection of a water leak by the first sensor.

15. The system according to claim 1, wherein the first fault condition comprises a detection of smoke by the first sensor.

16. The system according to claim 1, wherein the first sensor further comprises a virtual sensor disposed in the system controller and corresponding to a first expiration indicia indicating an expiration of a lease term associated with the first apartment.

17. The system according to claim 16, wherein the system controller further transmits a message to the first effector to deauthorize access by a first user to the first effector, the first user having a unique user access code for the first effector that is deactivated, in response to the expiration of the lease term.

18. A multi-unit access and control system for providing automation and control to multi-family housing complexes, the system comprising:
a first multi-family housing unit edge network associated with a first apartment and having a first control hub, a first sensor, and a first effector,
wherein the first sensor and the first effector are connected to the first control hub by at least one of a (i) wireless network and (ii) a wired connection,
the first control hub comprising a processor and one or more non-transitory computer-readable storage devices storing computing instructions configured to run on the processor and cause the processor to perform:
receiving a fault condition alarm from the first sensor corresponding to a first fault condition detected by the first sensor;
transmitting a fault condition alarm message to a system controller in response to the fault condition alarm; and
after, and in response to, the transmitting the fault condition alarm message to the system controller, receiving, from the system controller a first corrective instruction to the first effector to cause the first effector to actuate, the actuating ameliorating the first fault condition, and
after, and in response to, the transmitting the fault condition alarm message to the system controller, generating, by the system controller, a workorder containing data corresponding to (i) the fault condition alarm, (i) an identifier of the first apartment, (iii) an indication of the first corrective instruction, and
after, and in response to, the transmitting the fault condition alarm message to the system controller, transmitting, by the system controller, the workorder to a management device connected to the system controller via a network.

19. The multi-unit access and control system according to claim 18,
wherein the first sensor is a leak detector,
wherein the first effector includes a water valve;
wherein the first fault condition is a detection of a water leak by the leak detector, and
wherein the actuating ameliorates the first fault condition by closing the water valve of the first effector to stop a flow of water associated with the water leak.

20. The multi-unit access and control system according to claim 18,
wherein the first sensor is a virtual sensor disposed in the system controller and corresponding to a first expiration indicia indicating an expiration of a lease term associated with the first apartment,
wherein the first effector is a smart lock,
wherein the first fault condition is a detection of a valid user access code of a user of the apartment associated with the lease term that is expired, and
wherein the actuating ameliorates the first fault condition by denying unlocking of the smart lock responsive to an entry of the valid user access code of the user of the apartment.

21. The multi-unit access and control system according to claim 18,
wherein the first sensor is a smoke detector,
wherein the first effector is a workorder generation script operative in the system controller,
wherein the first fault condition is a detection of a depleted battery in the smoke detector by the first sensor,
wherein the actuating ameliorates the first fault condition by generating a work order and associated access code for a smart lock associated with physical access to the smoke detector, and
wherein the actuating further ameliorates the first fault condition by transmitting an alert message to a management device to provide a notification that the depleted battery is depleted.

22. A multi-unit access and control system for providing automation and control to multi-family housing complexes, the system comprising:
a first multi-family housing unit edge network associated with a first apartment and having a first sensor and first effector, the first multi-family housing unit edge network connected to a system controller via a network;
a second multi-family housing unit edge network associated with a second apartment and having a second sensor and second effector, the second multi-family housing unit edge network connected to the system controller via the network,
a management device comprising a smartphone application connectable to the system controller,
wherein the system controller comprises an access control module configured to:
(i) selectively authorize connection of a first resident device to the first multi-family housing unit edge network via the network;
(ii) selectively to disallow connection of the first resident device to the second multi-family housing unit edge network;
(iii) selectively authorize connection of a second resident device to the second multi-family housing unit edge network via the network;
(iv) selectively to disallow connection of the second resident device to the first multi-family housing unit edge network;
wherein the system controller is configured to receive a first alarm from the first sensor corresponding to a detected environmental condition in the first apartment and trigger an alert on the first resident device corresponding to the first alarm,
wherein the first effector is configured to actuate in response to the first alarm to ameliorate the detected environmental condition in the first apartment,
wherein the system controller is configured to receive a second alarm from the second sensor corresponding to a detected environmental condition in the second apartment and trigger an alert on the second resident device corresponding to the second alarm,
wherein the second effector is configured to actuate in response to the second alarm to unlock a door to the second apartment, and wherein the system controller transmits a first message to the management device in response to the first alarm and a second message to the management device in response to the second alarm.

* * * * *